(12) United States Patent
Kim et al.

(10) Patent No.: US 9,397,801 B2
(45) Date of Patent: Jul. 19, 2016

(54) METHOD FOR TRANSMITTING/RECEIVING DATA IN A WIRELESS ACCESS SYSTEM AND BASE STATION FOR SAME

(75) Inventors: Jinmin Kim, Anyang-si (KR); Seunghee Han, Anyang-si (KR); Hyunwoo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 339 days.

(21) Appl. No.: 14/005,701

(22) PCT Filed: Apr. 6, 2012

(86) PCT No.: PCT/KR2012/002635
§ 371 (c)(1),
(2), (4) Date: Sep. 17, 2013

(87) PCT Pub. No.: WO2012/138179
PCT Pub. Date: Oct. 11, 2012

(65) Prior Publication Data
US 2014/0016519 A1  Jan. 16, 2014

Related U.S. Application Data

(60) Provisional application No. 61/473,172, filed on Apr. 8, 2011, provisional application No. 61/477,143, filed on Apr. 19, 2011.

(51) Int. Cl.
| | |
|---|---|
| *H04L 5/00* | (2006.01) |
| *H04W 72/12* | (2009.01) |
| *H04L 1/18* | (2006.01) |

(52) U.S. Cl.
CPC .......... *H04L 5/0037* (2013.01); *H04L 1/1861* (2013.01); *H04L 5/0053* (2013.01); *H04L 5/0073* (2013.01); *H04W 72/1263* (2013.01); *H04L 1/1812* (2013.01); *H04L 5/001* (2013.01)

(58) Field of Classification Search
CPC ... H04L 5/0037; H04L 1/1861; H04L 5/0053; H04L 5/0073; H04L 5/001; H04L 1/1812; H04W 72/1263
See application file for complete search history.

(56) References Cited

U.S. PATENT DOCUMENTS

2006/0094363 A1* 5/2006 Kang .................... H04L 5/0032
455/63.1
2008/0025240 A1* 1/2008 Casaccia ............... H04L 1/1887
370/312

(Continued)

FOREIGN PATENT DOCUMENTS

| KR | 10-2006-0037572 A | 5/2006 |
| KR | 10-2009-0023711 A | 3/2009 |
| KR | 10-2010-0068466 A | 6/2010 |
| WO | WO 2010/074490 A2 | 7/2010 |

OTHER PUBLICATIONS

Catt, "Uplink-downlink subframe configuration information for the served cell", 3GPP TSG RAN WG3 Meeting #61, Aug. 18-22, 2008, R3-082018, 2 pages.

*Primary Examiner* — Ajay Cattungal
(74) *Attorney, Agent, or Firm* — Birch, Stewart, Kolasch & Birch, LLP

(57) ABSTRACT

The present invention relates to a method for transmitting/receiving data in a Time Division Duplex (TDD) wireless access system supporting multiple cells, and a base station for same. In more detail, on the basis of a multi-cell TDD uplink-downlink configuration, the method includes confirming whether a collision subframe occurs, which is caused when an uplink subframe of a first cell and a downlink subframe of a second cell exists in the same time interval; and performing cross cell scheduling on the second cell through the first cell according to a TDD uplink-downlink configuration of the first cell. When data transmission is scheduled in the collision subframe by cross cell scheduling, by changing the transmission position of an uplink or a downlink according to the cross cell scheduling, the scheduled data are transmitted in the collision subframe.

14 Claims, 15 Drawing Sheets

(56) References Cited

U.S. PATENT DOCUMENTS

2009/0080384 A1* 3/2009 Leung ................. H04W 72/082
                                                        370/336

2013/0295949 A1* 11/2013 Seo ...................... H04J 11/005
                                                        455/452.1
2013/0322378 A1* 12/2013 Guan ................ H04W 72/1289
                                                        370/329

* cited by examiner

METHOD FOR TRANSMITTING/RECEIVING DATA IN A WIRELESS ACCESS SYSTEM AND BASE STATION FOR SAME

This application is the National Phase of PCT/KR2012/002635 filed on Apr. 6, 2012, which claims priority under 35 U.S.C. 119(e) to U.S. Provisional Application Nos. 61/473,172 filed on Apr. 8, 2011 and 61/477,143 filed on Apr. 19, 2011, all of which are hereby expressly incorporated by reference into the present application.

TECHNICAL FIELD

The present invention relates to a wireless communication system, and more particularly, to a method for transmitting or receiving data in a time division duplex (TDD) wireless access system that supports carrier aggregation, and a base station supporting the same.

BACKGROUND ART

One of important things in requirements of a next generation wireless access system should support a demand of a high data transmission rate. To this end, various technologies such as multiple input multiple output (MIMO), cooperative multiple point transmission (CoMP), and relay have been studied.

A wireless access system of the related art has considered one carrier only even though bandwidths between an uplink and a downlink are configured to be different from each other. For example, a wireless communication system of which uplink and downlink respectively have a single carrier and uplink bandwidth is generally symmetrical with a downlink bandwidth has been provided.

However, in order to obtain a broad bandwidth for satisfying a demand of a higher data transmission rate considering that frequency resources reach a saturated condition, the wireless access system has been designed to satisfy basic requirements, which allow each of the bandwidths to operate its independent system, and has introduced carrier aggregation (CA) that groups a plurality of bandwidths in one system.

In this case, a carrier of a bandwidth unit that enables independent operation may be referred to as a component carrier (CC). In order to support transmission capacity which is increased, the recent 3GPP LTE-A or 802.16m system has extended a bandwidth to reach 20 MHz or more. In this case, one or more component carriers are aggregated to support a broad bandwidth. For example, if one component carrier supports a bandwidth of 5 MHz, 10 MHz or 20 MHz, maximum five component carriers are grouped to support a system bandwidth of maximum 100 MHz.

In a TDD system that supports such a carrier aggregation environment, if each uplink-downlink configuration is provided per carrier and cross carrier scheduling is performed, collision between a downlink of one carrier and an uplink of another carrier occurs, whereby a problem may occur in data transmission or reception.

DISCLOSURE

Technical Problem

An object of the present invention devised to solve the conventional problem is to provide a method and apparatus for efficiently transmitting or receiving data between a base station and a user equipment in a TDD wireless access system that supports a carrier aggregation environment.

Another object of the present invention devised to solve the conventional problem is to provide a method and apparatus for scheduling of uplink and downlink data transmission timing if uplink-downlink configurations of aggregated carriers are different from each other per carrier in a TDD wireless access system that supports a carrier aggregation environment.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, disclosed herein is a method for transmitting or receiving data in a TDD (Time Division Duplex) wireless access system supporting multiple cells having different uplink-downlink configurations, the method comprising identifying whether there is a collision subframe based on TDD uplink-downlink configurations of the multiple cells wherein the collision subframe indicates a time interval during which an uplink subframe of a first cell and a downlink subframe of a second cell coexist; and performing cross cell scheduling for the second cell through the first cell in accordance with a TDD uplink-downlink configuration of the first cell, wherein, if data transmission or reception is scheduled in the collision subframe by the cross cell scheduling, a position for uplink transmission or downlink transmission in accordance with the cross cell scheduling is changed to perform the data transmission or reception.

In another aspect of the present invention, disclosed herein is a base station for transmitting or receiving data in a TDD (Time Division Duplex) wireless access system supporting multiple cells having different uplink-downlink configurations, the base station comprising a radio frequency (RF) unit configured to transmit or receive a radio signal; and a processor configured to identify whether there is a collision subframe based on TDD uplink-downlink configurations of the multiple cells, wherein the collision subframe indicates a time interval during which an uplink subframe of a first cell and a downlink subframe of a second cell coexist, and to perform cross cell scheduling for the second cell through the first cell in accordance with a TDD uplink-downlink configuration of the first cell, wherein, if data transmission or reception is scheduled in the collision subframe by the cross cell scheduling, a position for uplink transmission or downlink transmission in accordance with the cross cell scheduling is changed to perform the data transmission or reception.

Preferably, the scheduling of the data transmission or reception in the collision subframe is performed through the second cell in accordance with a TDD uplink-downlink configuration of the second cell.

Preferably, if reception of a physical uplink shared channel (PUSCH) is scheduled in accordance with the TDD uplink-downlink configuration of the first cell in the collision subframe, the PUSCH is received from a user equipment through an uplink subframe of the second cell which is first available after the collision subframe.

Preferably, if reception of a physical uplink shared channel (PUSCH) is scheduled in accordance with the TDD uplink-downlink configuration of the first cell in the collision subframe, the PUSCH is received from a user equipment through the second cell in accordance a TDD uplink-downlink configuration of the second cell.

Preferably, offset information for a PUSCH transmission timing is transmitted to a user equipment, and if reception of a PUSCH is scheduled in accordance with the TDD uplink-downlink configuration of the first cell in the collision subframe, the PUSCH is received from the user equipment through an uplink subframe of the second cell, which is away from the collision subframe by the offset.

Preferably, if transmission of a physical hybrid-ARQ indicator channel (PHICH) is scheduled in accordance with the TDD uplink-downlink configuration of the first cell in the collision subframe, the PHICH is transmitted to a user equipment through the second cell in accordance with the TDD uplink-downlink configuration of the first cell.

Preferably, if transmission of a PHICH is scheduled in accordance with the TDD uplink-downlink configuration of the first cell in the collision subframe, the PHICH is transmitted to a user equipment through a downlink subframe of the first cell which is first available after the collision subframe.

Preferably, if transmission of a PHICH is scheduled in accordance with the TDD uplink-downlink configuration of the first cell in the collision subframe, the PHICH is transmitted to a user equipment through the first cell in accordance with the TDD uplink-downlink configuration of the second cell.

Preferably, offset information for a PHICH transmission timing is transmitted to a user equipment, and if transmission of a PHICH is scheduled in accordance with the TDD uplink-downlink configuration of the first cell in the collision subframe, the PHICH is transmitted to the user equipment through a downlink subframe of the first cell, which is away from the collision subframe by the offset.

Advantageous Effects

According to the embodiment of the present invention, data may efficiently be transmitted or received between the base station and the user equipment in a TDD wireless access system that supports a carrier aggregation environment.

Also, according to the embodiment of the present invention, scheduling for uplink and downlink data transmission timing may efficiently be performed if uplink-downlink configurations of carriers aggregated in a TDD wireless access system that supports a carrier aggregation environment are different from each other per carrier.

It will be appreciated by persons skilled in the art that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A.

Figure 1:
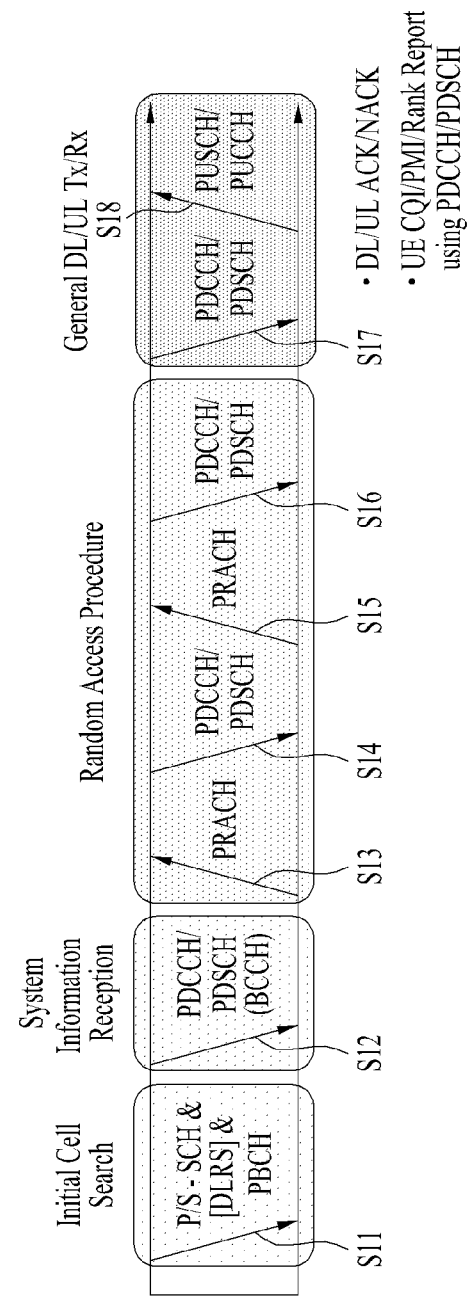
FIG. 1 is a diagram illustrating physical channels used in a 3GPP LTE system and a general method for transmitting a signal using the physical channels.

1. 3GPP LTE/LTE-A System to Which the Present Invention may be Applied 1.1 General System FIG. 1 is a diagram illustrating physical channels used in a 3GPP LTE system and a general method for transmitting a signal using the physical channels.

The user equipment performs initial cell search such as synchronizing with the base station when it newly enters a cell or the power is turned on at step S11. To this end, the user equipment synchronizes with the base station by receiving a primary synchronization channel (P-SCH) and a secondary synchronization channel (S-SCH) from the base station, and acquires information such as cell ID, etc.

Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S12.

Afterwards, the user equipment may perform a random access procedure (RACH) such as steps S13 to S16 to complete access to the base station. To this end, the user equipment may transmit a preamble through a physical random access channel (PRACH) (S13), and may receive a response message to the preamble through the PDCCH and the PDSCH corresponding to the PDCCH (S14). In case of a contention based RACH, the user equipment may perform a contention resolution procedure such as transmission (S15) of additional physical random access channel and reception (S16) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S17) and transmit a physical uplink shared channel (PUSCH) and a physical uplink control channel (PUCCH) (S18), as a general procedure of transmitting uplink/downlink signals.

Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CQI (Channel Quality Information), a PMI (Precoding Matrix Indicator), RI (Rank Indication), etc.

Although the UCI is periodically transmitted through the PUCCH in the LTE system, it may be transmitted through the PUSCH if control information and traffic data should be transmitted at the same time. Also, the user equipment may non-periodically transmit the UCI through the PUSCH in accordance with request/command of the network.

Figure 2:
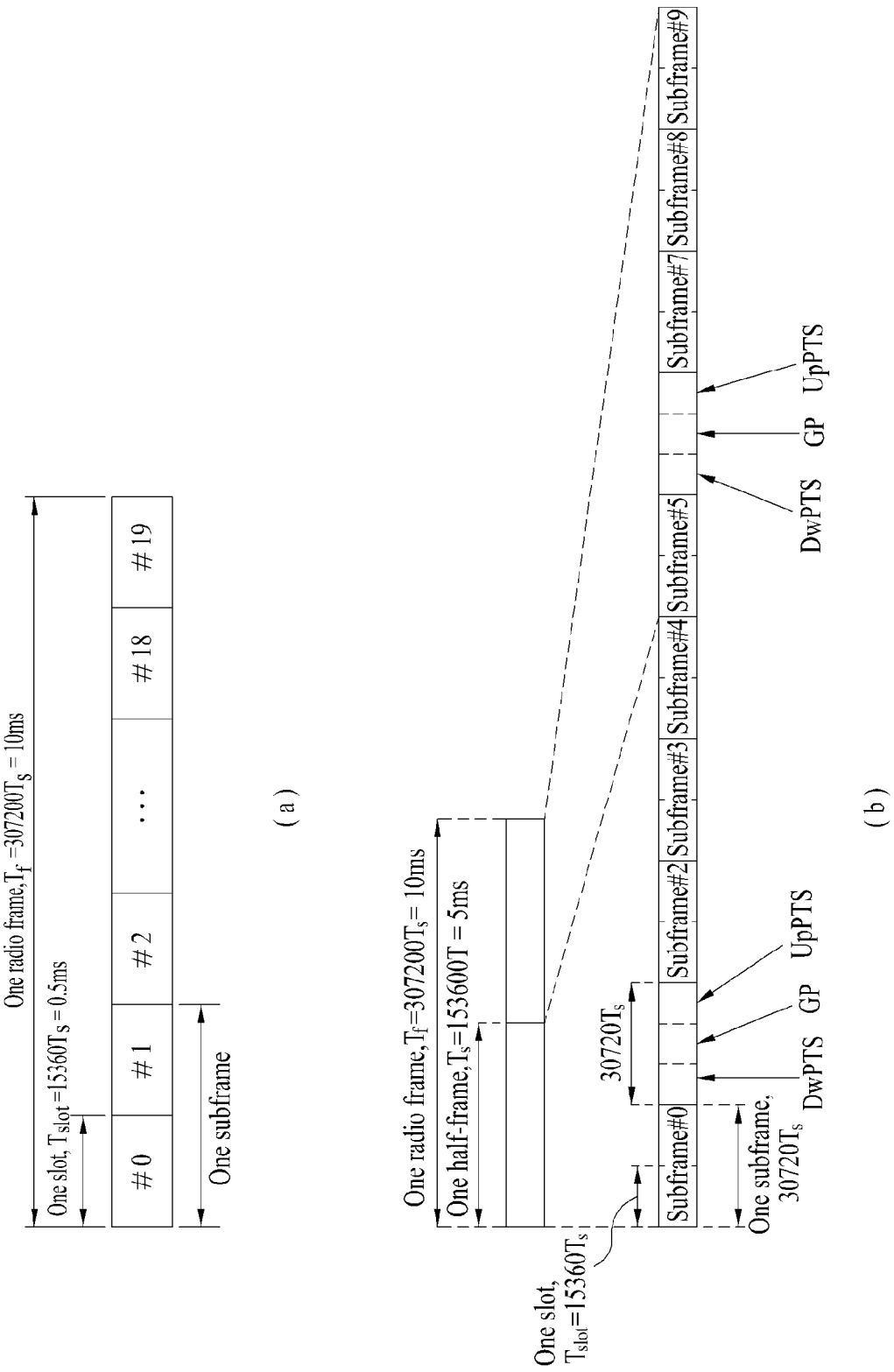
FIG. 2 is a diagram illustrating a structure of a radio frame in a 3GPP LTE system.

FIG. 2 is a diagram illustrating a structure of a radio frame in a 3GPP LTE system.

(a) FIG. 2 illustrates a frame structure type 1. The type 1 frame structure may be applied to both a full duplex FDD system and a half duplex FDD system.

One radio frame has a length of $T_f=307200 \cdot T_s=10$ ms, and includes 20 slots, each of which has an equivalent length of $T_{slot}=15360 \cdot T_s=0.5$ ms and to which indexes from 0 to 19 are given. One subframe is defined by two subsequent slots, in which the ith subframe includes slots corresponding to 2i and 2i+1. In other words, the radio frame includes 10 subframes. A time required to transmit one subframe will be referred to as a transmission time interval (TTI). In this case, $T_s$ represents a sampling time, and is expressed by $T_s=1/(15 \text{ kHz} \times 2048)= 3.2552 \times 10^{-8}$ (about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain.

One slot includes a plurality of OFDM symbols in the time domain. Since OFDMA is used on a downlink in the 3GPP LTE system, OFDM symbols represent one symbol period. The OFDM symbols may be referred to as SC-FDMA symbols or symbol period. The resource block is a resource allocation unit and includes a plurality of continuous subcarriers in one slot.

In the full duplex FDD system, 10 subframes may be used simultaneously for downlink transmission and uplink transmission for each period of 10 ms. In this case, the uplink transmission is divided from the downlink transmission in the frequency domain. On the other hand, in case of the half duplex FDD system, the user equipment cannot perform transmission or reception at the same time.

The aforementioned structure of the radio frame is only exemplary, and various modifications may be made in the number of subframes included in the radio frame or the number of slots included in the subframe, or the number of OFDM symbols included in the slot.

(b) of FIG. 2 illustrates a frame structure type 2. The frame structure type 2 is applied to the TDD system. One radio frame has a length of $T_f 307200 \cdot T_s=10$ ms and includes two half frames, each of which has a length of $153600 \cdot T_s=5$ ms. Each half frame includes five subframes, each of which has a length of $30720 \cdot T_s=1$ ms. The ith subframe includes two slots, each of which has a length of $T_{slot}=15360 \cdot T_s=0.5$ ms, corresponding to 2i and 2i+1. In this case, $T_s$ represents a sampling time, and is expressed by $T_s=1/(15 \text{ kHz} \times 2048)=3.2552 \times 10^{-8}$ (about 33 ns).

The frame structure type 2 includes a special subframe that includes a downlink pilot time slot (DwPTS), a guard period (GP), and an uplink pilot time slot (UpPTS). In the special subframe, DwPTS is used for initial cell search, synchronization or channel estimation at the user equipment. UpPTS is used to synchronize channel estimation at the base station with uplink transmission of the user equipment. Also, the guard period is to remove interference occurring in the uplink due to multipath delay of downlink signals between the uplink and the downlink.

TABLE 1

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | | |
| 5 | 6592·$T_s$ | 4384·$T_s$ | 5120·$T_s$ | 20480·$T_s$ | 4384·$T_s$ | 5120·$T_s$ |
| 6 | 19760·$T_s$ | | | 23040·$T_s$ | | |
| 7 | 21952·$T_s$ | | | — | — | — |
| 8 | 24144·$T_s$ | | | — | — | — |

Figure 3:
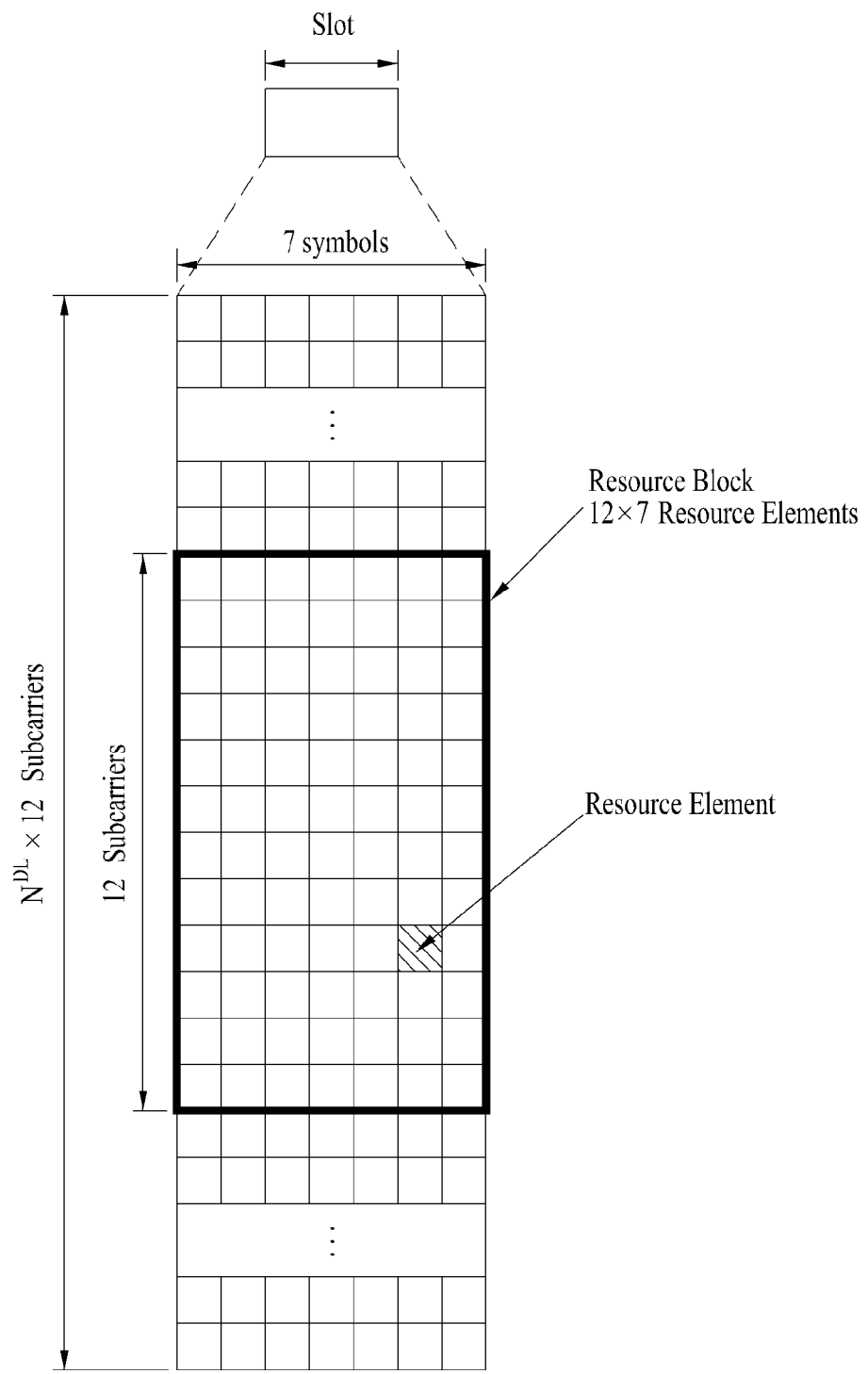
FIG. 3 is a diagram illustrating a resource grid of one downlink slot.

FIG. 3 is a diagram illustrating a resource grid of one downlink slot.

Referring to FIG. 3, one downlink slot includes a plurality of OFDM symbols in a time domain. In this case, one downlink slot includes, but not limited to, seven(six) OFDM symbols, and a resource block includes, but not limited to, twelve subcarriers in a frequency domain.

Each element on the resource grid will be referred to as a resource element (RE). One resource block (RB) includes 12×7(6) resource elements. The number NDL of resource blocks (RBs) included in the downlink slot depends on a downlink transmission bandwidth. A structure of an uplink slot may be the same as that of the downlink slot.

Figure 4:
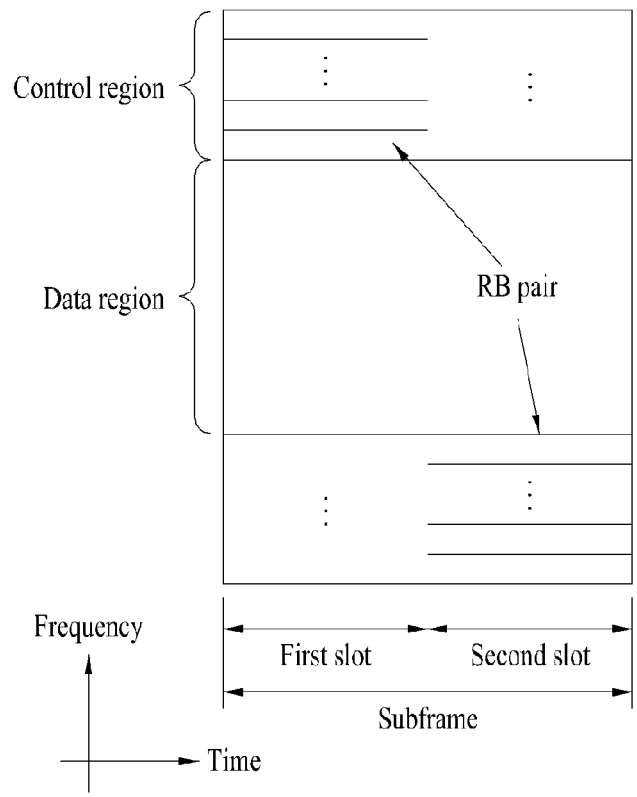
FIG. 4 is a diagram illustrating a structure of an uplink frame.

FIG. 4 is a diagram illustrating a structure of an uplink subframe.

Referring to FIG. 4, the uplink subframe may be divided into a control region and a data region on the frequency domain. A physical uplink control channel (PUCCH), which carries uplink control information, is allocated to the control region. A physical uplink shared channel (PUSCH), which carries user data, is allocated to the data region. In order to maintain single carrier features, one user equipment does not transmit the PUCCH and the PUSCH at the same time. The PUCCH for one user equipment is allocated with resource block (RB) pair within one subframe. Resource blocks (RBs) belonging to the RB pair occupy different subcarriers for each of two slots. The RB pair allocated to the PUCCH is subjected to frequency hopping at a slot boundary.

Figure 5:
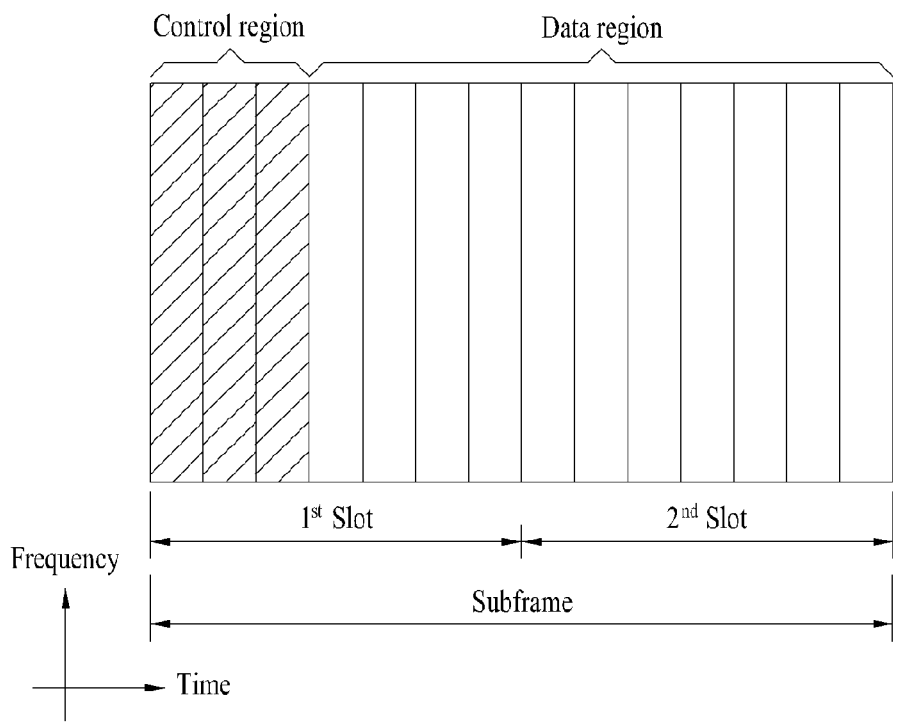
FIG. 5 is a diagram illustrating a structure of a downlink subframe.

FIG. 5 is a diagram illustrating a structure of a downlink subframe.

Referring to FIG. 5, maximum three OFDM symbols located at the front of the first slot of the subframe correspond to a control region to which control channels are allocated. The other OFDM symbols correspond to a data region to which a physical downlink shared channel (PDSCH) is allocated. Examples of the downlink control channel used in the 3GPP LTE include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and carries information on the number of OFDM symbols used for transmission of the control channels within the subframe. The PHICH carries HARQ ACK/NACK (acknowledgement/negative- acknowledgement) in response to uplink transmission. The control information transmitted through the PDCCH will be referred to as downlink control information (DCI). The DCI includes uplink resource allocation information, downlink resource allocation information, or uplink transmission (Tx) power control command for a random user equipment group.

1. 2. PDCCH (Physical Downlink Control Channel)

1. 2. 1. General PDCCH

The PDCCH may carry resource allocation and transport format (that may be referred to as downlink grant) of a downlink shared channel (DL-SCH), resource allocation information (that may be referred to as uplink grant) of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a user equipment group, and activity indication information of voice over Internet protocol (VoIP). A plurality of PDCCHs may be transmitted within the control region. The user equipment may monitor the plurality of PDCCHs. The PDCCH is configured by aggregation of one or a plurality of continuous control channel elements (CCEs). The PDCCH may be transmitted through the control region after subblock interleaving. The CCE is a logic allocation unit used to provide a coding rate based on the status of a radio channel to the PDCCH. The CCE corresponds to a plurality of resource element groups (REGs). The format of the PDCCH and the number of available bits of the PDCCH are determined depending on the correlation between a coding rate provided by the CCEs and the number of CCEs.

1. 2. 2. PDCCH Structure

A plurality of multiplexed PDCCHs for a plurality of user equipments may be transmitted within the control region. The PDCCHs are configured by aggregation of one or two or more continuous CCEs (CCE aggregation). The CCE means a unit corresponding to nine sets of REGs that include four resource elements. Four quadrature phase shift keying (QPSK) symbols are mapped into each REG. The resource elements occupied by a reference signal (RS) are not included in the REG. In other words, a total number of REGs within the OFDM symbol may be varied depending on whether a cell specific reference signal exists. The concept of REG for mapping four resource elements into one group may be applied to another downlink control channel (for example, PCFICH or PHICH). Supposing that REG which is not allocated to the PCFICH or PHICH is $N_{REG}$, the number of available CCEs in the system is $N_{CCE}=\lfloor N_{REG}/9 \rfloor$, and each CCE has indexes from 0 to $N_{CCE}-1$.

In order to simplify a decoding process of the user equipment, the PDCCH format, which includes n number of CCEs, may start from CCE having the same index as a multiple of n.

In other words, if the CCE index is i, the PDCCH format may start from CCE satisfying imodn=0.

The base station may use CCEs of {1, 2, 4, 8} to configure one PDCCH signal. In this case, {1, 2, 4, 8} will be referred to as a CCE aggregation level. The number of CCEs used for specific PDCCH transmission is determined by the base station in accordance with a channel status. For example, only one CCE may be sufficient for the PDCCH for the user equipment having an excellent downlink channel status (close to base station). On the other hand, in case of the user equipment having a poor channel status (in case of the user equipment located at the cell edge), eight CCEs may be required for sufficient robustness. Moreover, a power level of the PDCCH may be matched with the channel status.

Table 2 illustrates the format of the PDCCH, wherein four types of PDCCH formats are supported as illustrated in Table 1 in accordance with the CCE aggregation level.

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Since the format or modulation and coding scheme (MCS) level of the control information carried in the PDCCH is varied, the CCE aggregation level is varied per user equipment. The MCS level means a code rate used for data coding and modulation order. An adaptive MCS level is used for link adaptation. Generally, three to four MCS levels may be considered for the control channel for transmitting control information.

The format of the control information will be described. The control information transmitted through the PDCCH will be referred to downlink control information (DCI). Configuration of information carried in PDCCH payload may be varied in accordance with the DCI format. The PDDCH payload means information bit. Table 3 illustrates DCI based on the DCI format.

TABLE 3

| DCI Format | Description |
| --- | --- |
| Format 0 | Resource grants for the PUCCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments of PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for close loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to Table 2, examples of the DCI format include a format 0 for PUSCH scheduling, a format 1 for scheduling of one PDSCH codeword, a format 1A for compact scheduling of one PDSCH codeword, a format 1C for very compact scheduling of DL-SCH, a format 2 for PDSCH scheduling in a closed-loop spatial multiplexing mode, a format 2A for PDSCH scheduling in an open loop spatial multiplexing mode, and formats 3 and 3A for transmission of a transmission power control (TPC) command for an uplink channel. The DCI format 1A may be used for PDSCH scheduling even though several transmission modes are configured for the user equipment.

A PDCCH payload length may be varied depending on the DCI format. Also, a type of the PDCCH payload and a length of the PDCCH payload based on the type of the PDCCH payload may be varied depending on compact scheduling or transmission mode configured for the user equipment.

The transmission mode may be configured to allow the user equipment to receive downlink data through the PDSCH. For example, examples of the downlink data through the PDSCH include scheduled data for the user equipment, and broadcast information through paging, random access response or BCCH. The downlink data through the PDSCH has relation with the DCI format signaled through the PDCCH. The transmission mode may be configured semi-statically for the user equipment through upper layer signaling (for example, RRC signaling). The transmission mode may be divided into single antenna transmission and multi-antenna transmission. Examples of the multi-antenna transmission include transmit diversity, open-loop or closed-loop spatial multiplexing, multi-user-multiple input multiple output (MU-MIMO) or beamforming. The transmit diversity is the technology for increasing transmission reliability by transmitting same data from multiple transmitting antennas. Spatial multiplexing is the technology which can transmit high rate data without increasing a system bandwidth by transmitting different data from multiple transmitting antennas at the same time. Beamforming is the technology for increasing a signal to interference plus noise ratio (SINR) of a signal by allowing multiple antennas to add a weight value based on a channel status.

The DCI format depends on the transmission mode configured for the user equipment. The user equipment monitors a reference DCI format in accordance with the transmission mode configured therefor. The transmission mode configured for the user equipment may be classified into seven transmission modes.

(1) Single antenna port; port 0
(2) Transmit diversity
(3) Open-loop spatial multiplexing
(4) Closed-loop spatial multiplexing
(5) Multi-user MIMO
(6) Closed-loop rank=1 precoding
(7) Single antenna port; port 5

1. 2. 3. PDCCH Transmission

The base station determines a PDCCH format in accordance with DCI which will be transmitted to the user equipment, and attaches cyclic redundancy check (CRC) to control information. A unique identifier (RNTI (Radio Network Temporary Identifier) is masked with the CRC depending on owner of the PDCCH or usage of the PDCCH. If the PDCCH is for a specific user equipment, the unique identifier of the user equipment, for example, cell-RNTI (C-RNTI) may be masked with the CRC. If the PDCCH is for a paging message, a paging indicator identifier, for example, Paging-RNTI (P-RNTI) may be masked with the CRC. If the PDCCH is for system information, system information identifier and system information RNTI (SI-RNTI) may be masked with the CRC. In order to indicate a random access response which is the response to transmission of random access preamble of the user equipment, a random access RNTI (RA-RNTI) may be masked with the CRC.

Subsequently, the base station generates coded data by performing channel coding for CRC added control information. In this case, the base station may perform channel coding at a code rate based on the MCS level. The base station performs rate matching based on the CCE aggregation level allocated to the PDCCH format, and generates modulation symbols by modulating the coded data. In this case, a modulation order based on the MCS level may be used. The modulation symbols constituting one PDCCH may have a CCE aggregation level of one of 1, 2, 4, and 8. Afterwards, the base station maps the modulation symbols into physical resource elements (CCE to RE mapping).

1. 2. 4. Blind Decoding

A plurality of PDCCHs may be transmitted within one subframe. In other words, the control region of one subframe includes a plurality of CCEs having indexes $0 \sim N_{CCE,k}-1$. In this case, $N_{CCE,k}$ means the number of CCEs within the control region of the kth subframe. The user equipment monitors the plurality of PDCCHs per subframe. In this case, monitoring means that the user equipment tries to decode each of the PDCCHs in accordance with a DCI format which is monitored. In the control region allocated within a subframe, the base station does not provide the user equipment with information as to where the corresponding PDCCH is. Since the user equipment does not know a CCE aggregation level or DCI format with which its PDCCH is transmitted and does not know where its PDCCH is transmitted, to receive the control channel transmitted from the base station, the user equipment discovers its PDCCH by monitoring aggregation of PDCCH candidates within the subframe. This will be referred to as blind decoding/detection (BD). Blind decoding means that the user equipment performs de-masking for its UE ID in the CRC part and then detects CRC error to identify whether the corresponding PDCCH is its control channel.

In an active mode, the user equipment monitors its PDCCH to receive data transmitted thereto. In a DRX mode, the user equipment monitors the PDCCH at the subframe corresponding to a monitoring interval by waking up from the monitoring interval of every DRX period. The subframe for which monitoring of the PDCCH is performed will be referred to as non-DRX subframe.

The user equipment should perform blind decoding for all the CCEs existing in the control region of the non-DRX subframe to receive the PDCCH transmitted thereto. Since the user equipment does not know which PDCCH format will be transmitted thereto, the user equipment should decode all of the PDCCHs at an available CCE aggregation level until blind decoding of the PDCCH is successfully performed within every non-DRX subframe. Since the user equipment does not know how many CCEs will be used by its PDCCH, the user equipment should try detection at all available CCE aggregation levels until blind decoding of the PDCCH is successfully performed.

In the LTE system, a search space will be defined for blind decoding of the user equipment. The search space means a set of PDCC candidates for monitoring, and may have different sizes in accordance with each PDCCH format. The search space may include a common search space (CSS) and a user specific (UE-specific) search space (USS). The size of the common search space may be identified by all the user equipments, whereas the size of the UE specific search space may separately be set to each user equipment. Accordingly, the user equipment should both the UE specific search space and the common search space to decode the PDCCH. In this respect, the user equipment performs blind decoding of maximum 44 times for one subframe. In this case, blind decoding performed in accordance with different CRC values (for example, C-RNTI, P-RNTI, SI-RNTI, RA-RNTI) is not included in the blind decoding of maximum 44 times.

The base station may not obtain CCE resources for transmitting the PDCCH to all the user equipments within a given subframe due to a small search space. This is because that the CCE resources remaining after being allocated may not be included in the search space of the specific user equipment. In order to minimize this problem, user equipment specific hopping sequence may be applied to a start point of the user equipment specific search space.

Table 4 illustrates the sizes of the common search space and the user equipment specific search space.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to reduce calculative load of the user equipment based on the number of blind decoding times, the user equipment does not perform searches for all the DCI formats which are defined. In more detail, the user equipment always performs searches for the DCI formats 0 and 1A at the user equipment specific search space. In this case, although the DCI formats 0 and 1A have the same size, the user equipment may identify the DCI formats 0 and 1A from each other by using a flag for format 0/format 1A differentiation, which is included in the PDCCH. Also, in addition to the DCI formats 0 and 1A, another DCI formats may be required for the user equipment. Examples of the DCI formats that may additionally be required include DCI formats 1, 1B and 2.

The user equipment may search for the DCI formats 1A and 1C at the common search space. Also, the user equipment may be configured to search for the DCI format 3 or 3A. Although the DCI formats 3 and 3A have the same size as that of the DCI formats 0 and 1A, the user equipment may identify the DCI formats by using CRC scrambled by another identifier not the user equipment specific identifier.

The search space $S_k^{(L)}$ means a set of the PDCCH candidates based on the aggregation level $L \in \{1,2,4,8\}$. The CCE corresponding to the PDCCH candidate set m of the search space $S_k^{(L)}$ may be determined the following Equation 1.

[Equation 1]

$$L \cdot \{(Y_k+m) \bmod \lfloor N_{CCE,k}/L \rfloor\}+i$$

In this case, $M^{(L)}$ represents the number of PDCCH candidates based on the CCE aggregation level L for monitoring at the search space, and m=0, . . . , $M^{(L)}-1$. i is the index for designating each CCE from each PDCCH candidate, and i=0, . . . , L−1. k=$\lfloor n_s/2 \rfloor$, and $n_s$ represents a slot index within the radio frame.

As described above, the user equipment monitors both the user equipment specific search space and the common search space to decode the PDCCH. In this case, the common search space CSS the PDCCHs having the aggregation level of {4, 8}, and the user equipment specific search space supports the PDCCHs having the aggregation level of {1, 2, 4, 8}. Table 5 illustrates the PDCCH candidates monitored by the user equipment.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to the Equation 1, $Y_k$ is set to 0 for two aggregation levels, L=4 and L=8 at the common search space. On the other hand, the UE-specific search space of the aggregation level L, $Y_k$ is defined as expressed the following Equation 2.

[Equation 2]

$$Y_k = (A \cdot Y_{k-1}) \bmod D$$

In this case, $Y_{-1} = n_{RNTI} \neq 0$, and nRNTI represents RNTI value. Also, A=39827, and D=65537.

2. Carrier Aggregation Environment 2. 1. General Carrier Aggregation

A communication environment considered by the embodiments of the present invention includes a multi-carrier environment. In other words, a multi-carrier system or carrier aggregation system used in the present invention means a system that one or more component carriers (CCs) having a bandwidth smaller than a target bandwidth are aggregated when a target wideband is configured, to support a wideband.

In the present invention, multi-carrier means aggregation of carriers (or carrier aggregation). In this case, carrier aggregation means aggregation between non-neighboring carriers as well as aggregation between neighboring carriers. Also, the number of CCs aggregated between the downlink and the uplink may be configured differently. The case where the number of downlink CCs is the same as that of uplink CCs will be referred to as symmetric aggregation, whereas the case where the number of downlink CCs is different from that of uplink CCs will be referred to as asymmetric aggregation. Such carrier aggregation may be replaced with bandwidth aggregation or spectrum aggregation.

Carrier aggregation configured by aggregation of two or more component carriers (CC) aims to support a bandwidth of 100 MHz in the LTE-A system. When one or more carriers having a bandwidth smaller than a target bandwidth are aggregated, a bandwidth of the aggregated carriers may be limited to a bandwidth used in the existing system to maintain backward compatibility with the existing IMT system.

For example, the 3GPP LTE system supports bandwidths of {1.4, 3, 5, 10, 15, 20} MHz, and the 3GPP LTE-advanced system (that is, LTE-A) may support a bandwidth greater than 20 MHz using the above bandwidths supported by the LTE system. Also, the carrier aggregation system used in the present invention may support carrier aggregation by defining a new bandwidth regardless of the bandwidth used in the existing system.

The LTE-A system uses a concept of cell to manage radio resources. The aforementioned carrier aggregation environment may be referred to as a multiple cell environment. The cell is defined by combination of a pair of downlink resources (DL CC) and uplink resources (UL CC), wherein the uplink resources may be defined selectively. Accordingly, the cell may be configured by downlink resources only, or may be configured by downlink resources and uplink resources. If a specific user equipment has one configured serving cell, the user equipment may have one DL CC and one UL CC. However, if the specific user equipment has two or more configured serving cells, the user equipment may have DL CCs equivalent to the number of the cells but may have UL CCs the same as or smaller than the number of the cells. Alternatively, the user equipment may have UL CCs equivalent to the number of the cells but may have DL CCs the same as or smaller than the number of cells. In other words, if the specific user equipment has a plurality of configured cells, the carrier aggregation environment where the number of UL CCs is more than the number of DL CCs may be supported. In other words, carrier aggregation may be understood as aggregation of cells more than one, of which carrier frequencies (center frequencies of the cells) are different from one another. In this case, the 'cell' should be identified from the 'cell' as a region covered by the base station which is generally used.

The cell used in the LTE-A system includes a primary cell (PCell) and a secondary cell (SCell). The P cell and the S cell may be used as serving cells. Only one serving cell configured by the P cell exists in the user equipment that is not configured by carrier aggregation or does not support carrier aggregation although it is in RRC_CONNECTED state. On the other hand, one or more serving cells may exist in the user equipment that is RRC_CONNECTED and configured by carrier aggregation, and include P cell and one or more S cells.

The serving cells (PCell and SCell) may be configured through RRC parameter. PhysCellId is a physical layer identifier of the cell, and has an integer value between 0 and 503. SCellIndex is a short identifier used to identify SCell, and has an integer value between 1 and 7. ServCellIndex is a short identifier used to identify the serving cell (PCell or SCell, and has an integer value between 0 and 7. The value of 0 is applied to the P cell, and SCellIndex is previously given to be applied to the SCell. In other words, the cell having the smallest cell ID (or cell index) from the ServCellIndex becomes the PCell.

The P cell means a cell operated on the primary frequency (or primary CC). The P cell is used such that the user equipment performs an initial connection establishment procedure or connection re-establishment procedure. The P cell may refer to a cell indicated during a handover procedure. Also, the P cell means the cell that is a core of control related communication, among the serving cells configured under the carrier aggregation environment. In other words, the user equipment may be allocated with the PUCCH in its P cell only and transmit the PUCCH, and may use the P cell only to acquire system information or change a monitoring procedure. E-UTRAN (Evolved Universal Terrestrial Radio Access) may change the P cell only to allow the user equipment, which supports the carrier aggregation environment, to perform a handover procedure by using RRC connection re-configuration (RRCConnectionReconfiguration) message of an upper layer, which includes mobility control information mobilityControlInfo.

The S cell may mean a cell operated on the secondary frequency (or secondary CC). A single P cell may be allocated to a specific user equipment while one or more S cells may be allocated to the specific user equipment. The S cell may be configured after RRC connection is configured, and may be used to provide an additional radio resource. No PUCCH exists in the other cells except for the PCell, among the serving cells configured under the carrier aggregation environment, that is, the SCells. When the S cell is additionally provided to the user equipment that supports the carrier aggregation environment, the E-UTRAN may provide the user equipment all kinds of system information related to action at the corresponding cell of the RRC_CONNECTED state through dedicated signaling. The system information may be changed by release and addition of the corresponding S cell. In this case, the RRC connection reconfiguration (RRCConnectionReconfiguration) message of the upper layer may be used. The E-UTRAN may perform dedicated signaling having different parameters per user equipment instead of broadcasting within the related S cell.

After an initial security activity procedure starts, the E-UTRAN may configure a network that includes one or more S cells in addition to a P cell initially configured during a connection configuration procedure. In the carrier aggregation environment, the P cell and the S cell may be operated as component carriers, respectively. In the following embodiment, the primary component carrier (PCC) may be used to refer to the P cell, and the secondary component carrier (SCC) may be used to refer to the S cell.

Figure 6:
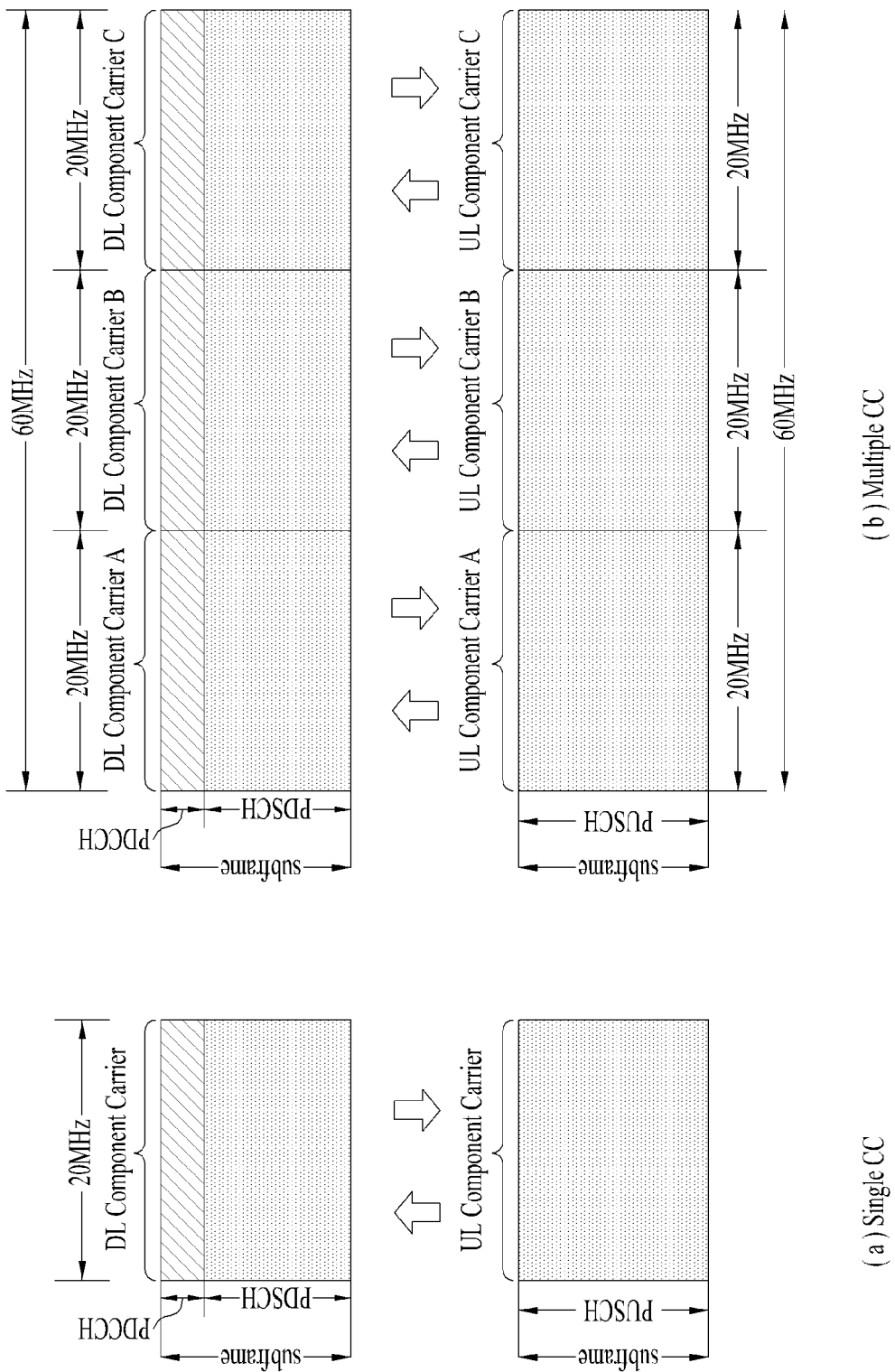
FIG. 6 is a diagram illustrating an example of a component carrier (CC) of an LTE system and carrier aggregation used in an LTE-A system.

FIG. 6 is a diagram illustrating an example of a component carrier (CC) of an LTE system and carrier aggregation used in an LTE-A system.

FIG. 6(a) illustrates a single carrier structure used in the LTE system. The component carrier includes a downlink component carrier (DL CC) and an uplink component carrier (UL CC). One component carrier may have a frequency range of 20 MHz.

FIG. 6(b) illustrates a carrier aggregation structure used in the LTE_A system. In FIG. 6(b), three component carriers having a frequency size of 20 MHz are aggregated. Although three DL CCs and three UL CCs are provided, there is no limitation in the number of DL CCs or UL CCs. In case of carrier aggregation, the user equipment may monitor three component carriers at the same time, receive downlink signal/data and transmit uplink signal/data.

If N DL CCs are managed by a specific cell, the network may allocate M (M≤N) number of DL CCs to the user equipment. In this case, the user equipment may monitor M number of limited DL CCs only and receive DL signal. Also, the network may give L (L≤M≤N) number of DL CCs a priority and allocate them to the user equipment as main DL CCs. In this case, the user equipment should L number of DL CCs necessarily. This system may also be applied to uplink transmission.

Linkage between a carrier frequency (or DL CC) of the downlink resource and a carrier frequency (or UL CC) of the uplink resource may be indicated by upper layer message such as RRC message or system information. For example, the linkage may mean a mapping relation between the DL CC to which PDCCH carrying UL grant is transmitted and the UL CC that uses the UL grant, or may mean a mapping relation between the DL CC (or UL CC) to which data for HARQ is transmitted and the UL CC (or DL CC) to which HARQ ACK/NACK signal is transmitted.

2. 2. Cross Carrier Scheduling

In the carrier aggregation system, there are provided a self-scheduling method and a cross carrier scheduling method in view of scheduling for carrier or serving cell. Cross carrier scheduling may be referred to as cross component carrier scheduling or cross cell scheduling.

Self-scheduling means that the PDCCH (DL grant) and the PDSCH are transmitted to the same DL CC, or the PUSCH transmitted in accordance with the PDCCH (UL grant) transmitted from the DL CC is transmitted through the UL CC linked to the DL CC that has received the UL grant.

Cross carrier scheduling means that the PDCCH (DL grant) and the PDSCH are transmitted to their respective DL CCs different from each other, or the PUSCH transmitted in accordance with the PDCCH (UL grant) transmitted from the DL CC is transmitted through another UL CC not the UL CC linked to the DL CC that has received the UL grant.

Cross carrier scheduling may be activated or deactivated UE-specifically, and may be notified to each user equipment semi-statically through upper layer signaling (for example, RRC signaling).

If cross carrier scheduling is activated, a carrier indicator field (CIF) is required for the PDCCH, wherein the CIF indicates DL/UL CC through which the PDSCH/PUSCH indicated by the PDCCH is transmitted. For example, the PDCCH may allocate PDSCH resource or PUSCH resource to any one of a plurality of component carriers by using the CIF. In other words, if the PDCCH on the DL CC allocates PDSCH or PUSCH resource to one of aggregated DL/UL CCs, the CIF is configured. In this case, the DCI format of the Rel-8 system may be extended in accordance with the CIF. In this case, the configured CIF may be fixed to 3 bit field, or its position may be fixed regardless of the size of the DCI format. Also, the PDCCH structure (same coding and same CCE based resource mapping) of the Rel-8 system may be reused.

On the other hand, if the PDCCH on the DL CC allocates PDSCH resource on the same DL CC or PUSCH resource on a single-linked UL CC, the CIF is not configured. In this case, the DCI format and the PDCCH structure (same coding and same CCE based resource mapping) the same as that of the Rel-8 system may be used.

When cross carrier scheduling is possible, the user equipment needs to monitor the PDCCH for a plurality of kinds of DCI in the control region of monitoring CC in accordance with a bandwidth and/or transmission mode per CC. Accordingly, configuration of the search space that may support PDCCH monitoring is required.

In the multi-carrier system, a set of UE DL CCs represents a set of DL CCs scheduled to allow the user equipment to receive the PDSCH, and a set of UE UL CCs represents a set of UL CCs scheduled to allow the user equipment to transmit the PDSCH. Also, the PDCCH monitoring set represents at least one DL CC set that performs PDCCH monitoring. The PDCCH monitoring set may be the same as the UE DL CC set, or may be a subset of the UE DL CC set. The PDCCH monitoring set may include at least one of DL CCs within the UE DL CC set. Alternatively, the PDCCH monitoring set may be defined separately regardless of the UE DL CC set. The DL CCs included in the PDCCH monitoring set may be configured to always enable self-scheduling for the linked UL CC. The UE DL CC set, the UE UL CC and the PDCCH monitoring set may be configured UE-specifically, UE group-specifically or cell-specifically.

If cross component carrier scheduling is deactivated, it means that the PDCCH monitoring set is always the same as the UE DL CC set. In this case, no indication such as separate signaling for the PDCCH monitoring set is required. However, if cross component carrier scheduling is activated, it is preferable that the PDCCH monitoring set is defined within the UE DL CC set. In other words, in order to schedule the PDSCH or PUSCH for the user equipment, the base station transmits the PDCCH through the PDCCH monitoring set only.

Figure 7:
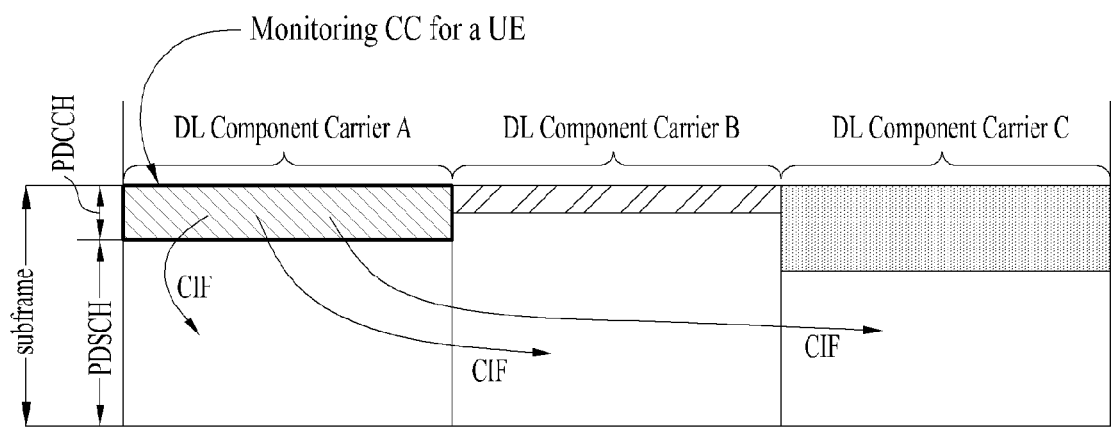
FIG. 7 is a diagram illustrating a subframe structure of an LTE-A system based on cross carrier scheduling.

FIG. 7 is a diagram illustrating a subframe structure of an LTE-A system based on cross carrier scheduling.

Referring to FIG. 7, in case of DL subframe for the LTE-A user equipment, three DL CCs are aggregated, and DL CC 'A' is set to a PDCCH monitoring DL CC. If the CIF is not used, each DL CC may transmit the PDCCH that schedules PDSCH of the DL CC without CIF. On the other hand, if the CIF is used through upper layer signaling, only one DL CC 'A' may transmit the PDCCH, which schedules PDSCH of another CC, as well as the PDCCH, which schedules its PDSCH, by using the CIF. In this case, DL CC 'B' and DL CC 'C', which are not set to the PDCCH monitoring DL CCs, do not transmit the PDCCH.

3. Uplink/Downlink Configuration in TDD System 3. 1. Uplink-Downlink Configuration in TDD System In the frame structure type 2, uplink-downlink configuration is a rule indicating that all the subframes are allocated (or reserved) for the uplink and the downlink. Table 6 illustrates uplink-downlink configuration.

TABLE 6

| Uplink-downlink configuration | Downlink-to-Uplink Switch-point periodicity | Subframe number | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 6, in each subframe of the radio frame, "D" represents the subframe for downlink transmission, "U" represents the subframe for uplink transmission, and "S" represents the special subframe that includes three fields of a downlink pilot time slot (DwPTS), a guard period (GP), and an uplink pilot time slot (UpPTS). The uplink-downlink configuration may be divided into seven types, and the number or position of downlink subframes, specific subframes and uplink subframes are varied depending on each configuration.

The timing point when the downlink is switched to the uplink or the timing point when the uplink is switched to the downlink will be referred to as a switching point. Switch-point periodicity means that switching of uplink subframe and downlink subframe is repeated equally and supports 5 ms or 10 ms. In case of 5 ms downlink-uplink switch-point period, the special subframe S exists per half-frame. In case of 5 ms downlink-uplink switch-point period, the special subframe S exists at the first half-frame only.

In every configuration, subframe indexes 0 and 5 (the 0th subframe and the 5th subframe) and DwPTS are for downlink transmission only. The UpPTS and the subframe subsequent to the special subframe are always for uplink transmission.

The uplink-downlink configuration is system information and may be known by both the base station and the user equipment. The base station may notify the user equipment of change of uplink-downlink allocation status of the radio frame by transmitting index only of uplink-downlink configuration information whenever the uplink-downlink configuration information is changed. Also, the uplink-downlink configuration information may be transmitted through a physical downlink control channel (PDCCH) which is a downlink control channel, as a kind of downlink control information in the same manner as other scheduling information, and may commonly be transmitted to all the user equipments within the cell through a broadcast channel as broadcast information. In the TDD system, the number of half frames included in the radio frame, the number of subframes included in the half frame, and combination of downlink subframes and uplink subframes are only exemplary.

3. 2. Uplink/Downlink Transmission Timing in TDD System

Figure 8:
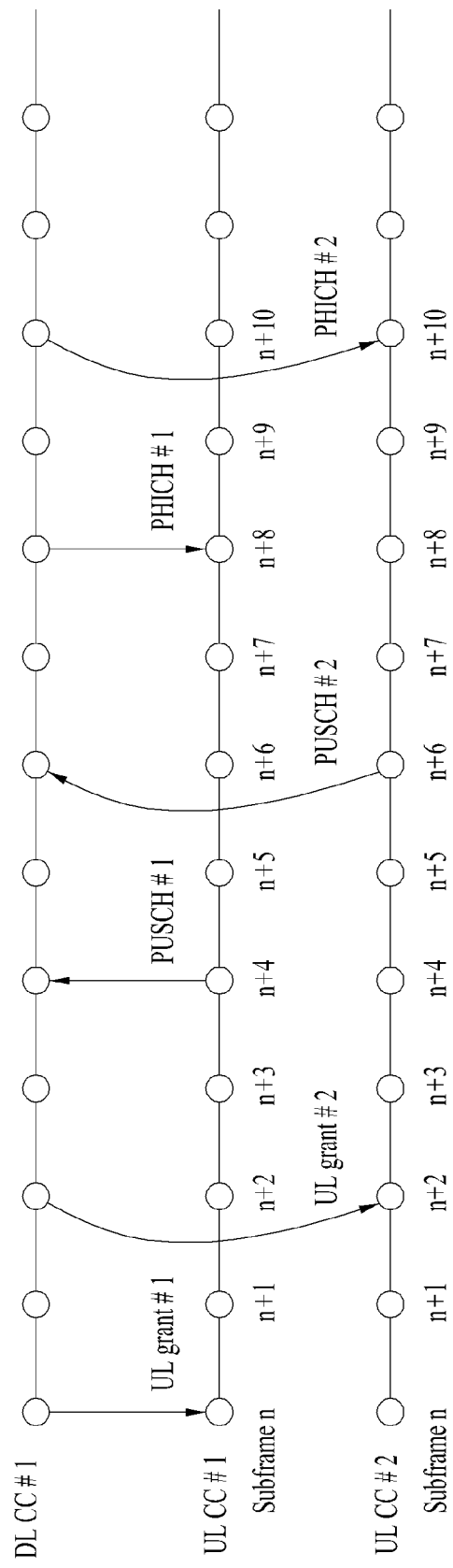
FIG. 8 is a diagram illustrating a transmission timing of UL grant, PUSCH and PHICH in an FDD system.

FIG. 8 is a diagram illustrating a transmission timing of UL grant, PUSCH and PHICH in an FDD system.

Referring to FIG. 8, if a specific user equipment receives UL grant at the nth downlink subframe, the user equipment transmits PUSCH at the n+4th uplink subframe. Also, if the specific user equipment transmits the PUSCH at the n+4th uplink subframe, PHICH which is ACK/NACK in response to the corresponding PUSCH is transmitted from the base station at the corresponding n+8th downlink subframe. In other words, the user equipment that has transmitted the PUSCH at the n+4th uplink subframe should search/detect/demodulate PHICH by predicting that PHICH response to the PUSCH transmitted at the n+8th downlink subframe will be transmitted from the base station.

In the meantime, since the downlink/uplink subframe configuration in the TDD system is varied per uplink-downlink configuration, PUSCH and PHICH transmission timing may be set differently in accordance with the configuration. The PUSCH transmission timing may be configured differently from the PHICH transmission timing in accordance with index (or number) of the subframe.

In the LTE system, uplink/downlink timing relation among the PUSCH, the PDCCH preceded by the PUSCH, and the PHICH corresponding to the PUSCH is previously determined, wherein downlink HARQ ACK/NACK is transmitted to the PHICH.

Table 7 illustrates transmission timing of the PDCCH and the PUSCH corresponding to the PDCCH based on each uplink-downlink configuration.

TABLE 7

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | 4 | | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Referring to Table 7, in case of uplink-downlink configurations 1 to 6, when the user equipment receives UL grant from the base station through the PDCCH at the nth downlink subframe or should perform retransmission after receiving the PHICH, the user equipment transmits the PUSCH at the n+kth uplink subframe corresponding to the downlink subframe index in accordance with the downlink subframe index to which the PDCCH (or PHICH) is transmitted. In this case, k value is the same as that illustrated in Table 7.

In case of the uplink-downlink configuration 0, in accordance with a value of uplink index (UL index) within the uplink DCI format, or a downlink subframe number to which the PHICH is transmitted and a value of $I_{PHICH}$ received by the upper layer, the user equipment may transmit the PUSCH in accordance with Table 7 or at the n+7th uplink subframe, or may transmit the PUSCH at both the uplink subframe according to Table 7 and the n+7th uplink subframe.

Figure 9:
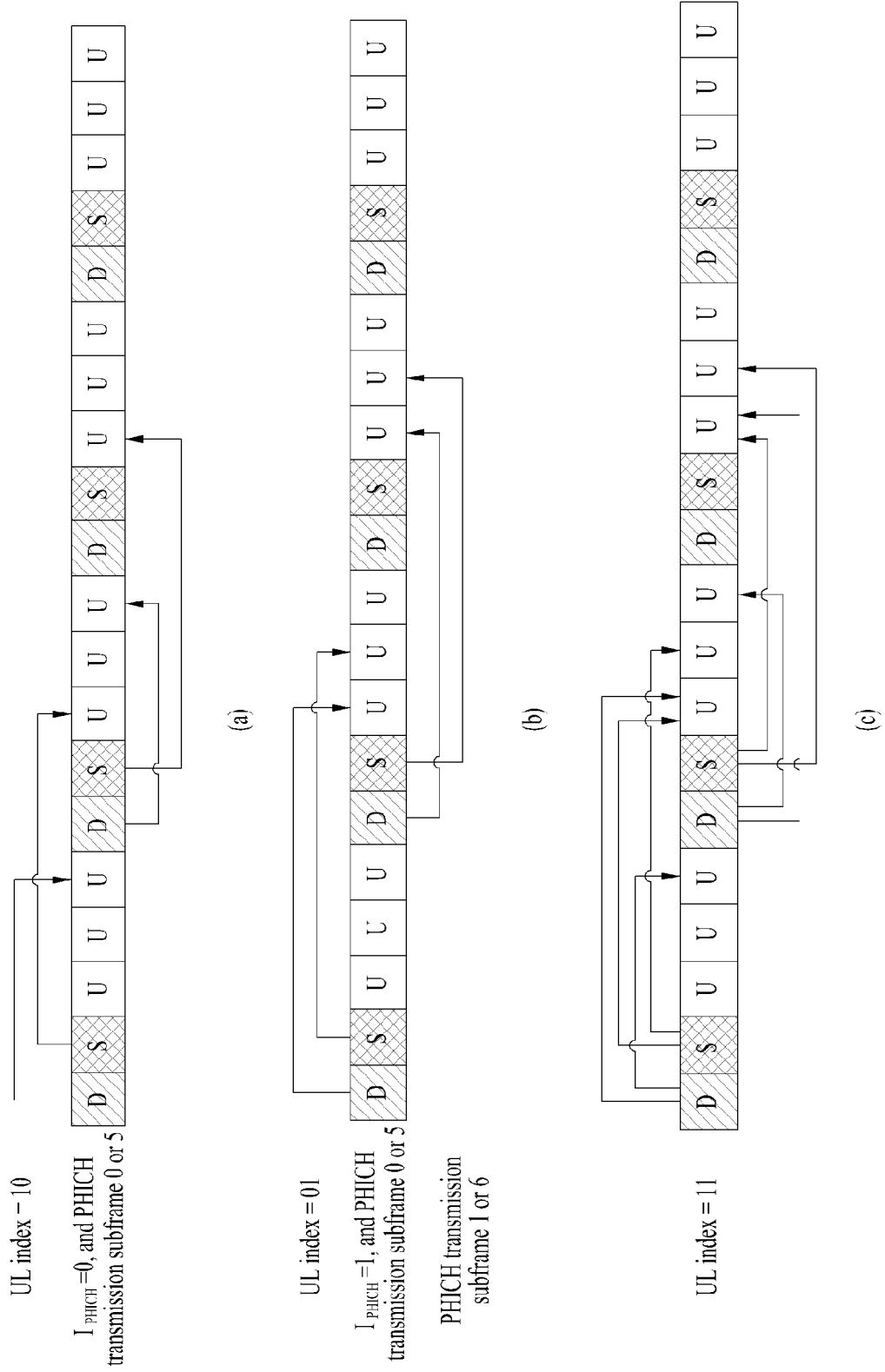
FIG. 9 is a diagram illustrating an example of PUSCH transmission of a user equipment in a TDD system.

FIG. 9 is a diagram illustrating an example of PUSCH transmission of a user equipment in a TDD system.

(a) of FIG. 9 illustrates an example of PUSCH transmission timing when UL index is 10, or when the PHICH is transmitted through the 0th downlink subframe or the fifth downlink subframe and in this case the value of $I_{PHICH}$ is 0.

(b) of FIG. 9 illustrates an example of PUSCH transmission timing when UL index is 01, or when the PHICH is transmitted through the 0th downlink subframe or the fifth downlink subframe and in this case the value of $I_{PHICH}$ is 1, or when the PHICH is transmitted through the first or sixth downlink subframe.

(c) of FIG. 9 illustrates an example of PUSCH transmission timing when UL index is 11. In this case, UL grant within each DCI format may designate two PUSCHs at the same time.

In the meantime, if the user equipment receives the PHICH, which includes HARQ ACK/NACK, from the base station at the downlink subframe i, the corresponding PHICH corresponds to the PUSCH transmitted from the user equipment at the uplink subframe i-k. In this case, the value of k is the same as that illustrated in Table 8.

Table 8 illustrates transmission timing of the PUSCH and the PHICH corresponding to the PUSCH based on each uplink-downlink configuration.

TABLE 8

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | | 4 | | 6 |
| 2 | | | 6 | | | | | 6 | | |
| 3 | 6 | | | | | | | 6 | 6 | |
| 4 | | | | | | | | 6 | 6 | |
| 5 | | | | | | | | 6 | | |
| 6 | | 6 | 4 | | | | 7 | 4 | | 6 |

In case of uplink-downlink configurations 1 to 6 or in case of uplink-downlink configuration 0 and $I_{PHICH}=0$, when the user equipment receives the PHICH from the base station at the subframe i, the PHICH corresponds to the PUSCH transmitted from the user equipment at the subframe i-k. On the other hand, in case of uplink-downlink configuration 0 and $I_{PHICH}=1$, when the user equipment receives the PHICH, which transmits HARQ-ACK, from the base station at the subframe i, the PHICH corresponds to the PUSCH transmitted from the user equipment at the subframe i-6.

After transmitting a transport block to the base station through the PUSCH subframe corresponding to the downlink subframe i, if the user equipment receives the PHICH corresponding to the transport block at the downlink subframe i and decodes ACK, or if the transport block is disabled by the PDCCH transmitted at the downlink subframe i, the user equipment transfers the ACK corresponding to the transport block to the upper layer. If not so, NACK for the transport block is transferred to the upper layer.

In view of the user equipment, ACK/NACK response (or PHICH) for uplink transmission through the PUSCH of the user equipment at the nth uplink subframe is transmitted from the base station at the n+kth downlink subframe corresponding to the uplink subframe index in accordance with the uplink subframe index. In case of subframe bundling, the corresponding PHICH corresponds to the last subframe of the bundle. The user equipment should search/detect/demodulate the PHICH by predicting that the PHICH response to the PUSCH transmitted at the n+kth downlink subframe will be transmitted from the base station. In this case, the value of k is the same as that illustrated in Table 9.

Table 9 illustrates transmission timing of the PUSCH and the PHICH corresponding to the PUSCH based on each uplink-downlink configuration.

TABLE 9

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | 4 | 6 | 6 | | | | 4 | 7 | |

The PHICH resource is identified by a pair of indexes such as $(n_{PHICH}^{group}, n_{PHICH}^{seq})$. $n_{PHICH}^{group}$ represents a PHICH group number, and $n_{PHICH}^{seq}$ represents an orthogonal sequence index within the corresponding PHICH group. $n_{PHICH}^{group}$ and $n_{PHICH}^{seq}$ may be obtained by the Equation 3 below.

[Equation 3]

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH}$$

In this case, $n_{DMRS}$ is mapped from a cyclic shift for a demodulation reference signal (DMRS) field of the most recent PDCCH having an uplink DCI format for the transport block related to corresponding PUSCH transmission. On the other hand, if an initial PUSCH for the same transport block is scheduled semi-persistently or scheduled by a random access response grant signal due to a lack of the PDCCH having the uplink DCI format for the same transport block, $n_{DMRS}$ is set to 0.

$N_{SF}^{PHICH}$ represents a size of a spreading factor used for PHICH modulation.

$I_{PRB\_RA}$ is the same as $I_{PRB\_RA}^{lowest\_index}$ if it is the first transport block of the PUSCH related to the PDCCH or if the number of transport blocks recognized passively when there is no related PDCCH is not equal to the number of transport blocks indicated by the most recent PDCCH related to the corresponding PUSCH. On the other hand, $I_{PRB\_RA}$ is the same as $I_{PRB\_RA}^{lowest\_index}+1$ if it is the second transport block of the PUSCH related to PDCCH> In this case, $I_{PRB\_RA}^{lowest\_index}$ corresponds to the lowest PRB index of the first slot of the corresponding PUSCH transmission.

$N_{PHICH}^{group}$ represents a number of the PHICH group configured by the upper layer.

$I_{PHICH}$ has 1 if the PUSCH is transmitted at the subframe index 4 or 9 of the uplink-downlink configuration 0 in the TDD system. $I_{PHICH}$ has 1 if not so.

Table 10 illustrates a mapping relation between the cyclic shift for the DMRS field used to determine PHICH resource at the PDCCH having the uplink DCI format and $n_{DMRS}$.

TABLE 10

| Cyclic Shift for DMRS Field in PDCCH with uplink DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

4. Uplink/Downlink Scheduling in TDD System of Carrier Aggregation Environment

As described above, cross cell scheduling may be performed in the multi-cell environment UE-specifically to avoid interference or efficiently manage resources. Cross cell scheduling means that one cell (hereinafter, referred to as 'scheduling cell') transmits uplink/downlink resource allocation (UL/DL grant) information of other cell (hereinafter, referred to as 'scheduled cell'). The scheduling cell is used for transmission of PDCCH information, which includes UL/DL grant of the scheduled cell, when cross cell scheduling for the scheduled cell is supported, and means the cell used for transmission of the PHICH corresponding to the PUSCH of the scheduled cell. The scheduled cell is used for transmission of the PUSCH corresponding to the PDCCH through the scheduling cell, and means the cell used for retransmission of the PUSCH corresponding to the PHICH of the scheduling cell. The scheduling cell may use the CIF value of the DCI format to identify the PDCCH information, which includes UL/DL grant of the scheduled cell, from the PDCCH information, which includes UL/DL grant of the scheduling cell. In this way, if cross cell scheduling is performed, HARQ-ACK information of the PDSCH/PUSCH scheduled by the corresponding UL/DL grant is transmitted through the scheduling cell only.

Since the TDD system of the existing multi-cell environment has considered that the same uplink-downlink configuration is used in each cell, there is no ambiguity for transmission timing of each of the PUSCH and the PHICH during cross cell scheduling. However, since use of the same uplink-downlink configuration does not consider uplink or downlink traffic for each cell appropriately, a problem occurs in that cell throughput is reduced. Accordingly, in order to improve cell throughput, a scheme has been considered in which a separate uplink-downlink configuration is used for each cell to enable efficient data transmission.

When cross cell scheduling is supported with a separate uplink-downlink configuration for each cell, a problem occurs in transmission timing of the PUSCH or the PHICH due to collision subframe between a downlink of one cell and an uplink of another cell.

Figure 10:
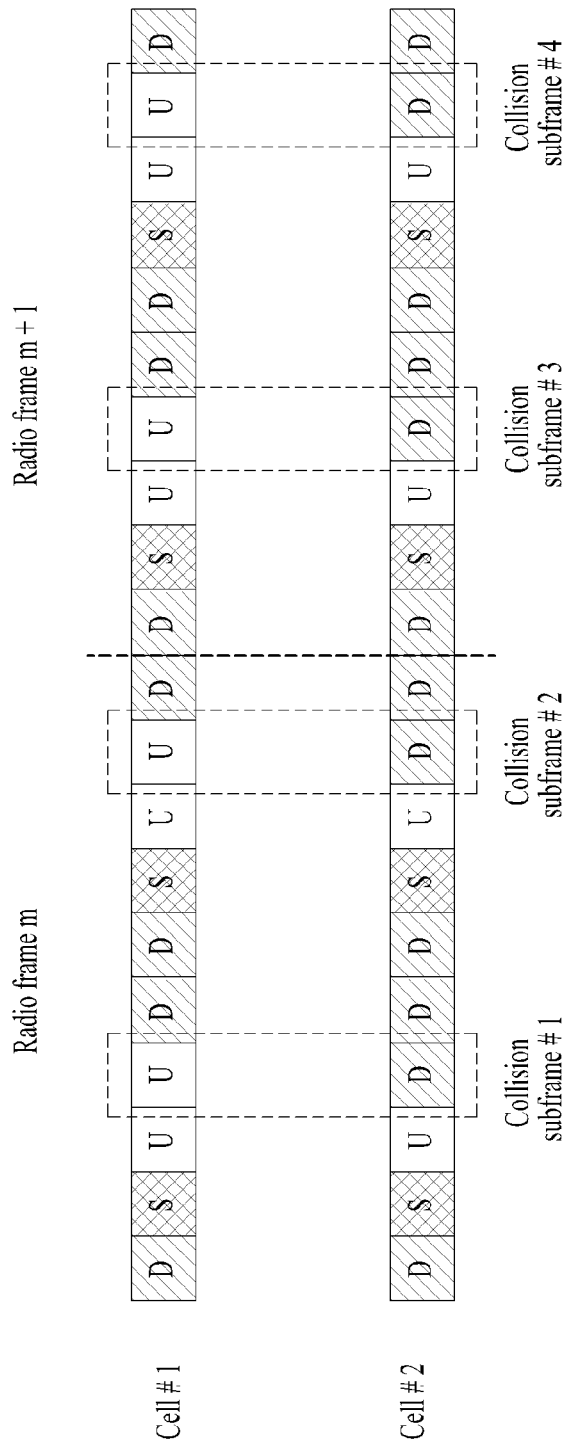
FIG. 10 is a diagram illustrating an occurrence example of a collision subframe.

FIG. 10 is a diagram illustrating an occurrence example of a collision subframe.

Referring to FIG. 10, the subframe shown by a dotted line represents the collision subframe, and collision occurs between an uplink subframe of cell 1 and a downlink subframe of cell 2. However, in this example of FIG. 10, although one user equipment uses two cells, a plurality of cells may be applied to the multi-cell environment set to the user equipment.

In FIG. 10, it is assumed that Cell#1 (P cell or S cell) is a scheduling cell and Cell#2 (S cell) is a scheduled cell.

First of all, PUSCH transmission will be described. If the transmission timing of the PUSCH of Cell#2 is calculated on the basis of the PUSCH transmission timing according to uplink-downlink configuration of Cell#1, uplink subframe may not exist in Cell#2 at the corresponding PUSCH transmission timing. Also, if the transmission timing of the PUSCH of Cell#2 is calculated on the basis of the PUSCH transmission timing according to uplink-downlink configuration of Cell#2, Cell#1 is configured by the uplink subframe not the downlink subframe at the downlink subframe for which UL grant is transmitted, whereby a problem occurs in that UL grant for cross cell scheduling cannot be transmitted.

Next, PHICH transmission will be described. If the transmission timing of the PHICH of Cell#2 is calculated on the basis of the PHICH transmission timing according to uplink-downlink configuration of Cell#1, the PHICH transmission timing based on Cell#1 cannot be applied to the Cell#1 due to a lack of uplink subframe at the time when the corresponding PUSCH is transmitted in the Cell#2. Also, if the transmission timing of the PHICH of Cell#1 is calculated on the basis of the PHICH transmission timing according to uplink-downlink configuration of Cell#2, downlink subfram may not exist in the Cell#1 at the corresponding PHICH transmission timing.

As described above, a method for PUSCH and/or PHICH transmission timing due to a collision subframe, which may occur if a separate uplink-downlink configuration is used for each cell and cross cell scheduling is performed, will be suggested. Hereinafter, it is assumed that a separate uplink-downlink configuration is used for each of a plurality of cells set to the user equipment.

4. 1. Uplink/Downlink Scheduling in Collision Subframe

Figure 11:
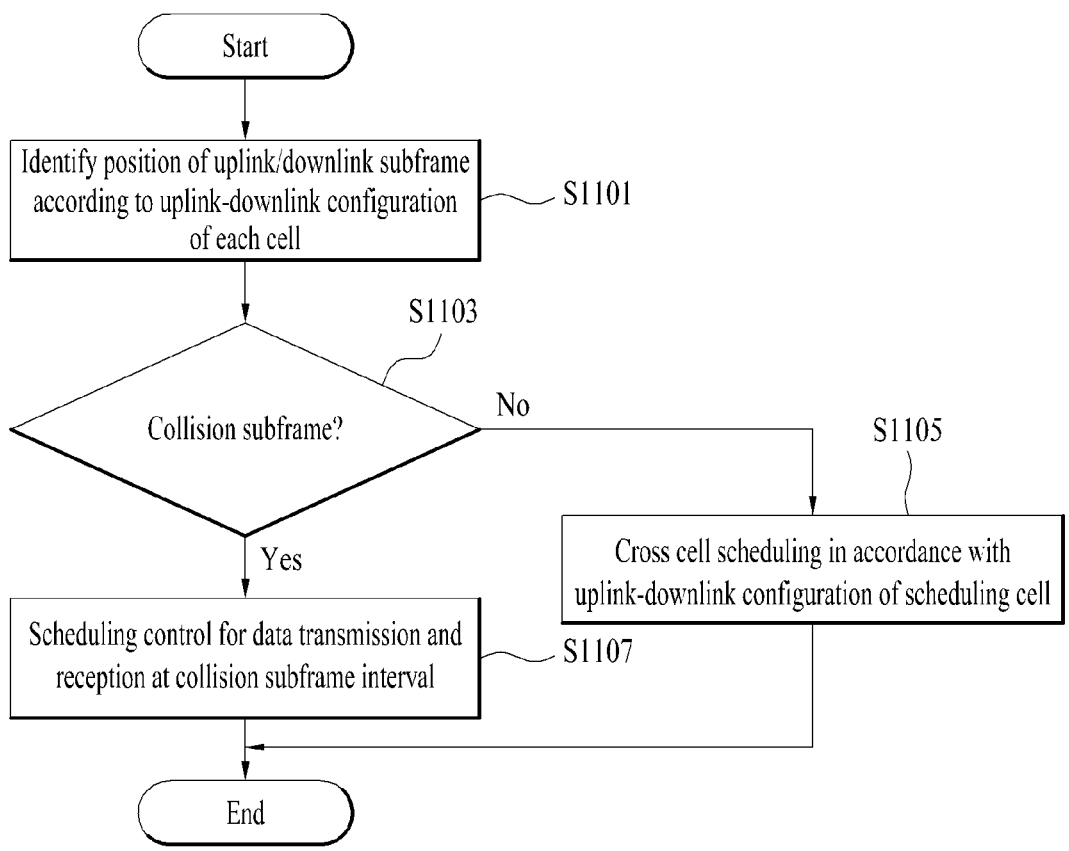
FIG. 11 is a diagram illustrating an uplink and downlink scheduling method according to one embodiment of the present invention.

FIG. 11 is a diagram illustrating an uplink and downlink scheduling method according to one embodiment of the present invention.

Referring to FIG. 11, in case of a user equipment for which a plurality of cells are configured, a base station identifies positions of uplink subframe and downlink subframe, which are allocated (or reserved) for each cell in accordance with TDD uplink-downlink configuration of each cell configured for the user equipment (S1101). As described above, the uplink-downlink configuration information (for example, Table 6) may be known to both the base station and the user equipment as system information, and the base station may notify the user equipment of uplink-downlink configuration owned by each cell by transmitting index of the uplink-downlink configuration information.

After identifying the position of the uplink subframe or the downlink subframe defined for each cell, the base station identifies whether a collision subframe exists (S1103). In other words, the base station identifies whether collision occurs between subframes of two cells such that a downlink subframe of one cell and an uplink subframe of the other cell are located at the same timing period (or subframe index).

At the step S1103, if the collision subframe does not exist, the base station performs cross cell scheduling in accordance with uplink-downlink configuration of the scheduling cell (S1105). In other words, the base station transmits the PDCCH for UL/DL grant of the scheduled cell through the scheduling cell, and transmits the PHICH for HARQ ACK/NACK corresponding to the PUSCH of the scheduled cell through the scheduling cell.

At the step S1103, if the base station identifies that the collision subframe exists, the base station controls scheduling for data transmission or reception in the collision subframe so as not to perform cross cell scheduling according to the uplink-downlink configuration of the aforementioned scheduling cell (S1107). In other words, if the timing when the base station transmits UL/DL grant, the timing when the user equipment transmits the PUSCH, or the timing when the base station transmits the PHICH corresponds to the collision subframe, the base station changes a position for uplink or downlink transmission according to the uplink-downlink configuration of the scheduling cell, and transmits or receives at the changed position data scheduled in the collision subframe.

In the meantime, if different uplink-downlink configurations between the cells are used, cross cell scheduling may not be used. As described above, the base station may notify the user equipment of the uplink-downlink configuration information through the system information, and if different uplink-downlink configurations between the cells are used, the base station and the user equipment assume that there is no cross cell scheduling and may operate in accordance with self-scheduling method. For example, UL grant for the scheduled cell may be transmitted through the scheduled cell, and the PHICH, which includes HARQ ACK/NACK for the PUSCH of the scheduled cell may be transmitted through the scheduled cell. it will be appreciated that if the same uplink-downlink configuration between the cells is used, cross cell scheduling may be used.

Hereinafter, a scheduling method of the base station for data transmission or reception at the collision subframe interval will be described.

4. 2. UL/DL Grant or PUSCH Scheduling

The base station may perform scheduling according to UL/DL grant or PUSCH transmission timing by means of any one of methods, which will be described hereinafter, or combination of two or more of the methods.

4. 2. 1. Transmission Through Scheduled Cell

Figure 12:
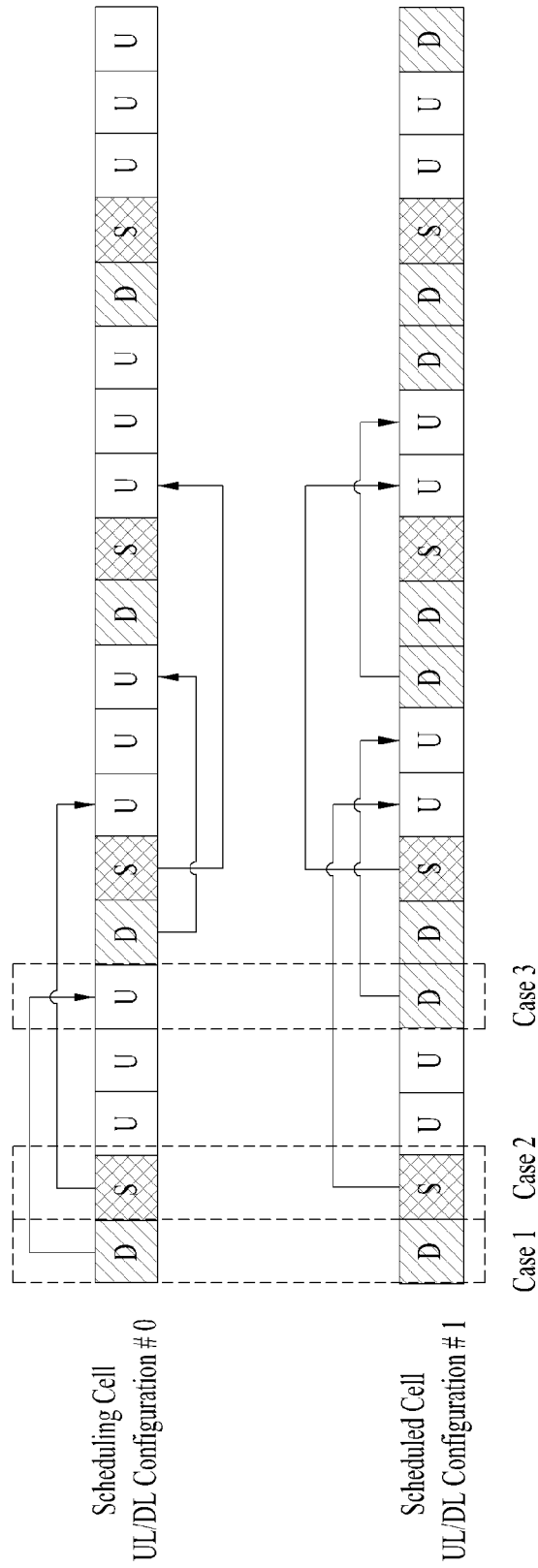
FIG. 12 is a diagram illustrating an example of cross cell scheduling performed for a plurality of cells having different uplink-downlink configurations.

FIG. 12 is a diagram illustrating an example of cross cell scheduling performed for a plurality of cells having different uplink-downlink configurations.

Referring to FIG. 12, if the PUSCH transmission timing is considered based on the scheduling cell, the user equipment receives UL grant of the scheduled cell from the base station through the scheduling cell to perform cross cell scheduling in the subframe of case 1. Afterwards, the user equipment should transmit the PUSCH through the scheduled cell in the uplink subframe of case 3 but cannot transmit the PUSCH through the scheduled cell since the downlink subframe is presence instead of the uplink subframe in the scheduled cell at the corresponding PUSCH transmission period. Also, the user equipment should receive DL/UL grant through the scheduled cell in the subframe of case 3 but cannot receive the DL/UL grant of the scheduled cell from the base station through the scheduling cell since the scheduling cell is configured to have the uplink subframe.

Accordingly, if PUSCH transmission of the scheduled cell should be performed by the user equipment in the collision subframe, or if the user equipment should receive DL/UL grant of the scheduled cell in the collision subframe, cross cell scheduling is restricted. The corresponding user equipment may receive DL/UL grant for the scheduled cell within the collision subframe from the scheduled cell, and may transmit DL/UL grant for the PUSCH of the scheduled cell within the collision subframe through the scheduled cell.

On the other hand, since there is no problem in performing cross cell scheduling in the subframe corresponding to case 2, the user equipment may receive UL grant for the scheduled cell from the scheduling cell in the subframe of case 2 by performing cross cell scheduling.

Figure 13:
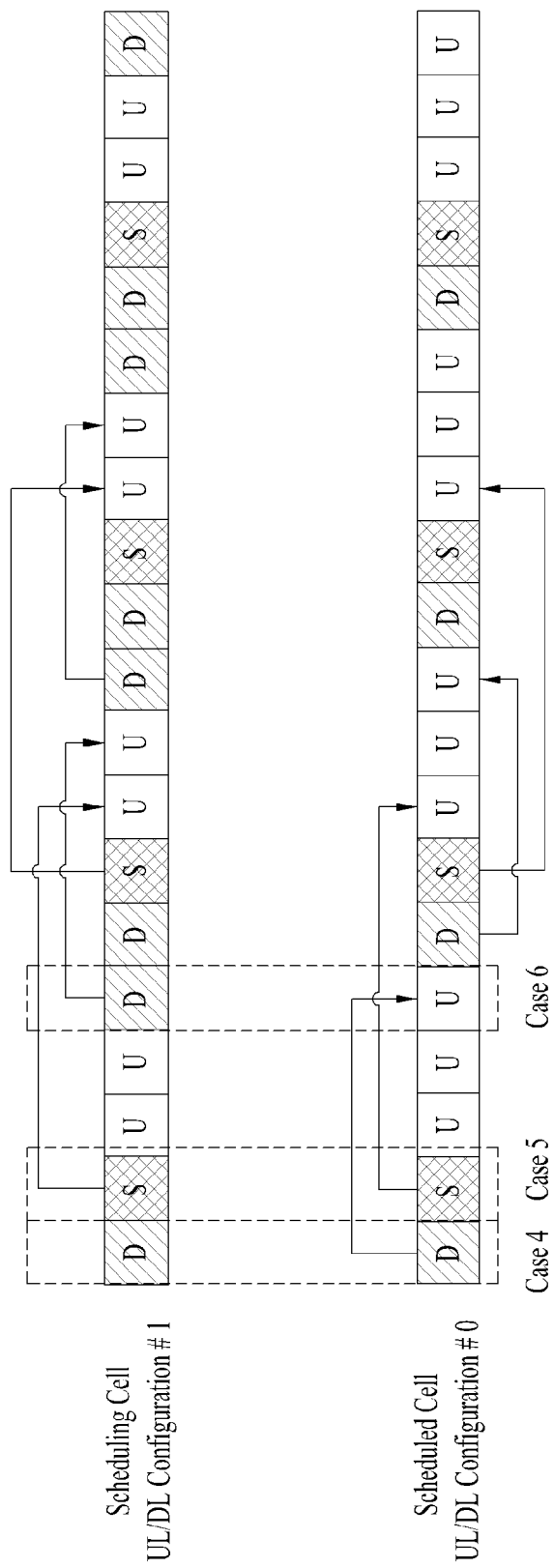
FIG. 13 is a diagram illustrating another example of cross cell scheduling performed for a plurality of cells having different uplink-downlink configurations.

FIG. 13 is a diagram illustrating another example of cross cell scheduling performed for a plurality of cells having different uplink-downlink configurations.

Referring to FIG. 13, although an uplink subframe exists in the scheduled cell in the collision subframe, since a reference for PUSCH transmission timing or UL grant, which may schedule the corresponding uplink subframe, does not exist in the scheduling cell, cross cell scheduling cannot be performed. A reference for PUSCH transmission timing or UL grant for transmitting PUSCH in the subframe of case 6 does not exist in the subframe of case 4 of the scheduling cell.

Accordingly, cross cell scheduling may be restricted in the corresponding subframe, and the user equipment may receive UL grant for the PUSCH of the scheduled cell in the subframe of case 6 from the scheduled cell in the subframe of case 4.

On the other hand, since there is no problem in performing cross cell scheduling in the subframe of case 5, the user equipment may receive UL grant for the scheduled cell from the scheduling cell in the subframe of case 5 by performing cross cell scheduling.

In summary, if the transmission timing of the UL/DL grant or the transmission timing of the PUSCH for a plurality of cells having different uplink-downlink configurations corresponds to the collision subframe, the corresponding UL/DL grant and the UL grant for the corresponding PUSCH may be transmitted through the scheduled cell. In this case, the transmission timing of the UL/DL grant may follow the uplink-downlink configuration of the scheduled cell.

4. 2. 2. PUSCH Transmission in the Subframe Coming First after Collision Subframe FIG. 14 is a diagram illustrating an example of controlling cross cell scheduling for a plurality of cells having different uplink-downlink configurations.

Figure 14:
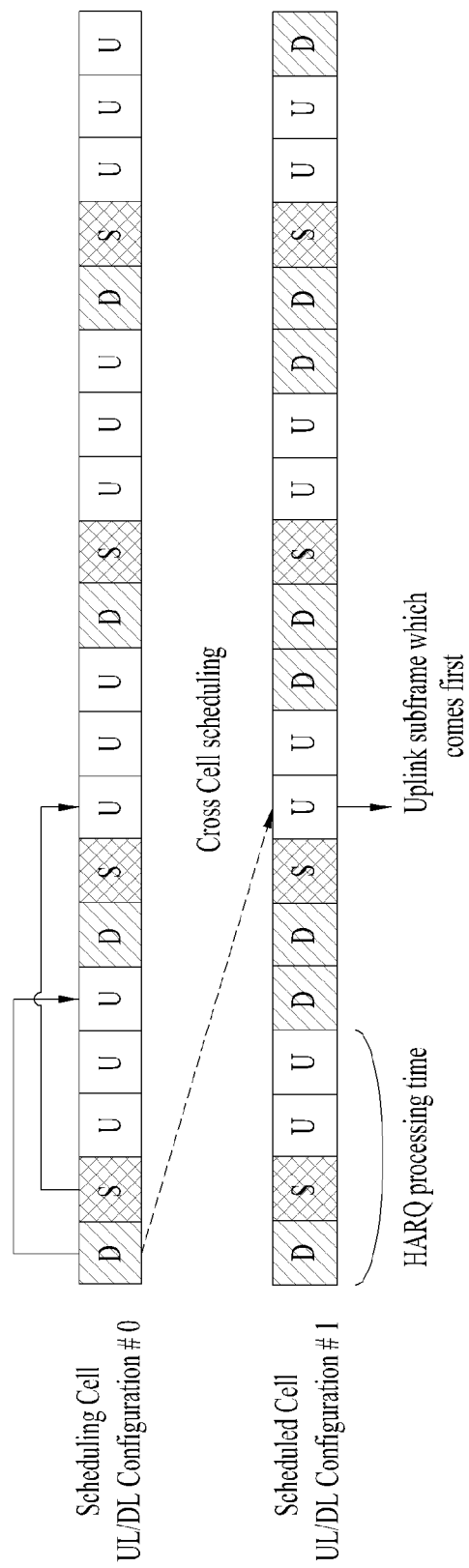
FIG. 14 is a diagram illustrating an example of controlling cross cell scheduling for a plurality of cells having different uplink-downlink configurations.

Referring to FIG. 14, although the user equipment that has received the UL grant through the scheduling cell in the first subframe should transmit the PUSCH through the scheduled cell in the fifth subframe, since the fifth subframe is the collision subframe, the user equipment cannot transmit the PUSCH through the scheduled cell.

Accordingly, if cross cell scheduling is performed within the collision subframe, the PUSCH of the scheduled cell can be transmitted through an uplink subframe of the scheduled cell which is first available (or comes first) after HARQ processing time (for example, 4 subframe) from the subframe for which the UL grant is received from the scheduling cell. In this case, if the HARQ processing time corresponds to four subframes, since the uplink subframe of the scheduled cell which is first available (or comes first) after the fifth subframe is the eighth subframe, the user equipment transmits the PUSCH through the scheduled cell in the eighth subframe.

Also, the user equipment may transmit the PUSCH through the uplink subframe which is first available (or comes first) after the PUSCH transmission timing determined by Table 7. In Table 7, according to the uplink-downlink configuration 0, since the PUSCH transmission timing corresponds to the fifth subframe and the first-coming (or the most-preceding) uplink subframe of the scheduled cell after the fifth subframe corresponds to the eighth subframe, the user equipment transmits the PUSCH through the scheduled cell in the eighth subframe. Accordingly, if the user equipment receives the UL grant through the nth subframe, the user equipment may transmit the PUSCH through the scheduled cell in the n+jth subframe. In this case, the value of j may be varied depending on the uplink-downlink configuration and the subframe number (index) in which the UL grant is received. In this case, the PUSCH transmission timing may be calculated in accordance with index of the downlink subframe in which the UL grant is transmitted, on the basis of the uplink-downlink configuration of the scheduled cell.

4. 2. 3. PUSCH Transmission Based on PUSCH Transmission Timing of Scheduled Cell FIG. 15 is a diagram illustrating another example of controlling cross cell scheduling for a plurality of cells having different uplink-downlink configurations.

Figure 15:
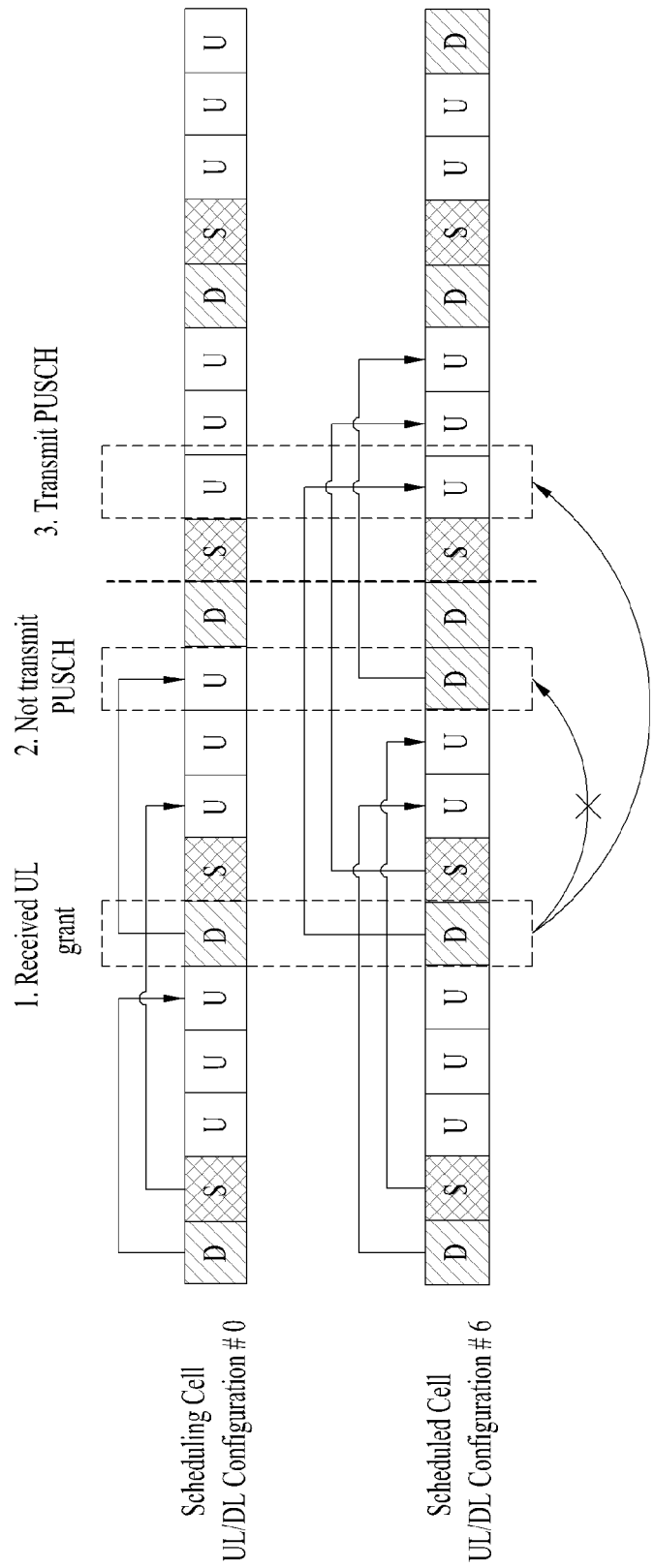
FIG. 15 is a diagram illustrating another example of controlling cross cell scheduling for a plurality of cells having different uplink-downlink configurations.

Referring to FIG. 15, according to the uplink-downlink configuration 0 (scheduling cell), the PUSCH transmission timing corresponds to the fourth subframe from the time when the user equipment receives the UL grant. However, since there is no uplink subframe at the corresponding time of the scheduled cell, the user equipment receives the UL grant but cannot transmit the PUSCH through the scheduled cell at the transmission timing based on the scheduling cell.

Accordingly, if cross cell scheduling is performed within the collision subframe, the user equipment may transmit the PUSCH on the basis of the PUSCH transmission timing of the scheduled cell. In FIG. 15, according to the uplink-downlink configuration 6 (scheduled cell), the PUSCH transmission timing corresponds to the seventh subframe from the time when the user equipment receives the UL grant. In other words, the user equipment transmits the PUSCH through the scheduled cell in the seventh subframe from the time when the UL grant is received, on the basis of the PUSCH transmission timing of the scheduled cell.

4. 2. 4. Setting of Offset Value for PUSCH Transmission Timing

If cross cell scheduling is performed within the collision subframe, the base station may transmit transmission timing information for the PUSCH of the corresponding scheduled cell to the user equipment by using upper layer signaling or certain bits of the DCI format of the PDCCH. In this case, supposing that the subframe in which the user equipment receives the UL grant through the scheduling cell corresponds to the nth subframe, the transmission timing information for the PUSCH, which is transmitted using upper layer signaling or certain bits of the DCI format of the PDCCH, may be subdivided as follows.

1) The transmission timing of the PUSCH may be set through an offset (m) value on the basis of the nth subframe. Accordingly, the user equipment may transmit the PUSCH through the scheduled cell in the n+kth subframe.

2) The transmission timing of the PUSCH may be set through an offset (m) value on the basis of the PUSCH transmission timing (n+k1) for the UL grant of the scheduled cell. Accordingly, the user equipment may transmit the PUSCH through the scheduled cell in the n+k1+mth subframe.

3) The transmission timing of the PUSCH may be set through an offset (m) value on the basis of the PUSCH transmission timing (n+k2) for the UL grant of the scheduled cell. Accordingly, the user equipment may transmit the PUSCH through the scheduled cell in the n+k2+mth subframe.

4. 3. PHICH Scheduling

The base station may perform scheduling based on the PHICH transmission timing by means of any one of methods, which will be described hereinafter, or combination of two or more of the methods. 4. 3. 1. Transmission Through Scheduled Cell If cross cell scheduling is performed within the collision subframe, the base station may transmit PHICH for the PUSCH of the scheduled cell within the collision subframe through the scheduled cell by restricting cross cell scheduling. In more detail, if the PUSCH based on cross cell scheduling is transmitted from the user equipment in the nth subframe, and if the n+kth subframe of the scheduling cell for which PHICH response of the base station to the PUSCH transmission is predicted corresponds to the uplink subframe actually, the base station transmits the PHICH response through the subframe of the scheduled cell. In other words, although the user equipment basically monitors the scheduling cell to receive the PHICH response, if there is no downlink subframe in the scheduling cell as described above, the user equipment temporarily monitors the scheduled cell at the corresponding timing. In this case, the value of k may be obtained by the PHICH transmission timing in accordance with the uplink-downlink configuration and the uplink subframe index for which the PUSCH is transmitted, on the basis of the scheduled cell, or may be obtained by the PHICH transmission timing in accordance with the uplink-downlink configuration and the uplink subframe index for which the PUSCH is transmitted, on the basis of the scheduling cell.

4. 3. 2. PHICH Transmission in the Subframe which is First Available after Collision Subframe If cross cell scheduling is performed within the collision subframe, the base station may transmit PHICH of the scheduling cell through the downlink subframe of the scheduling cell which is first available (or comes first) after HARQ processing time (for example, 4 subframe) from the subframe in which the PUSCH of the scheduled cell is received.

Also, the base station may transmit the PHICH through the downlink subframe which is first available (or comes first) after the PHICH transmission timing determined by Table 8. In this case, the PHICH transmission timing may be calculated in accordance with the uplink subframe index for which the PUSCH is transmitted, on the basis of the uplink- downlink configuration of the scheduled cell or the scheduling cell.

4. 3. 3. PHISCH Transmission on the Basis of PHICH Transmission Timing of Scheduled Cell If cross cell scheduling is performed within the collision subframe, the base station transmits HARQ-ACK information at the PHICH transmission timing for the PUSCH of the scheduled cell. In other words, the base station follows the PHICH transmission timing reference of the scheduled cell.

1) If the base station follows the PHICH transmission timing reference of the scheduled cell, the base station may transmit the PHICH through the scheduling cell if the downlink subframe exists in the scheduling cell.

2) If the downlink subframe does not exist in the scheduling cell, the base station may transmit the PHICH through the downlink subframe of the scheduled cell. In this case, the base station may configure such that the corresponding user equipment may acquire PHICH information from the scheduled cell.

4. 3. 4. Setting of Offset Value for PHICH Transmission Timing

If cross cell scheduling is performed within the collision subframe, the base station may transmit PHICH transmission timing information for the PUSCH of the corresponding scheduled cell to the user equipment by using upper layer signaling or certain bits of the DCI format of the PDCCH. In this case, supposing that the subframe in which the base station receives the PUSCH through the scheduled cell corresponds to the nth subframe, the transmission timing information of the PHICH, which is transmitted using upper layer signaling or certain bits of the DCI format of the PDCCH, may be subdivided as follows.

1) The transmission timing of the PHICH may be set through an offset (m) value on the basis of the nth subframe. Accordingly, the user equipment may receive the HARQ-ACK information through the scheduling cell in the n+kth subframe.

2) The transmission timing of the PHICH may be set through an offset (m) value on the basis of PHICH transmission timing rule for the uplink subframes of the most adjacent scheduling cell in the nth subframe. In this case, the subframes of the most adjacent scheduling cell mean a certain number of subframes before or after the nth subframe in which the PUSCH is transmitted.

3) The transmission timing of the PHICH may be set through an offset (m) value on the basis of the PHICH transmission timing rule of the scheduled cell in the nth subframe. The user equipment may receive the HARQ-ACK information through the scheduling cell in the n+kth subframe.

5. General Apparatus to which Present Invention may be Applied

Figure 16:
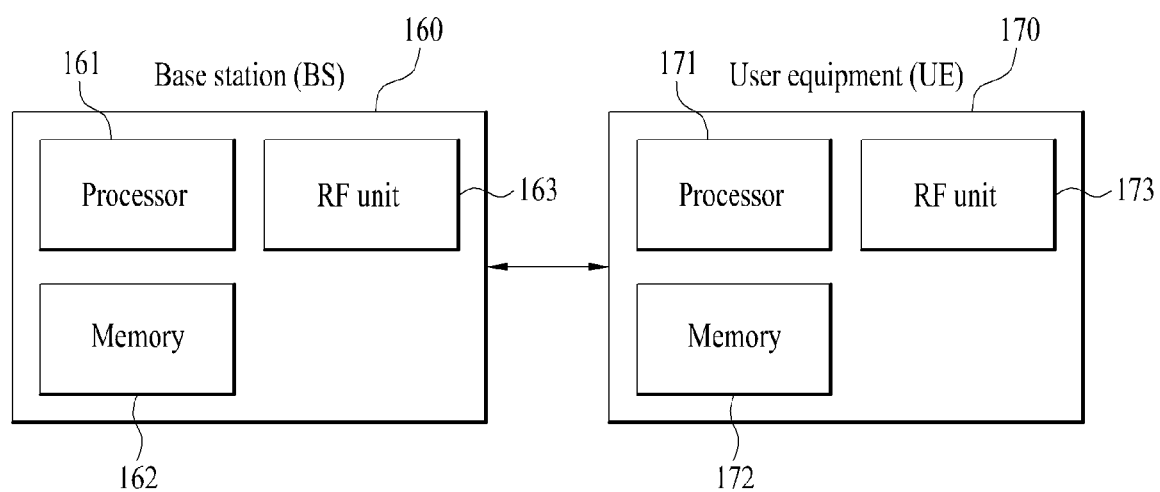
FIG. 16 is a block diagram illustrating a communication apparatus according to one embodiment of the present invention.

FIG. 16 is a block diagram illustrating a communication apparatus according to one embodiment of the present invention.

Referring to FIG. 16, the wireless communication system includes a base station 160 and a plurality of user equipments 170 located within a zone of the base station 160.

The base station 160 includes a processor 161, a memory 162, and a radio frequency (RF) unit 163. The processor 161 may be configured to implement functions, procedures and/or methods suggested in the present invention. Layers of a radio interface protocol may be implemented by the processor 161. The memory 162 is connected with the processor 161 and stores various kinds of information for driving the processor 161. The RF unit 163 is connected with the processor 161 and transmits and/or receives a radio signal.

The user equipment 170 includes a processor 171, a memory 172, and a radio frequency (RF) unit 173. The processor 171 may be configured to implement functions, procedures and/or methods suggested in the present invention. The memory 172 is connected with the processor 171 and stores various kinds of information for driving the processor 171. The RF unit 173 is connected with the processor 171 and transmits and/or receives a radio signal.

The memory 162 or 172 may be located inside or outside the processor 161 or 171, and may be connected with the processor 161 or 171 by means which are well known. Also, the base station 160 and/or the user equipment 170 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission or reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit or receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the method for transmitting or receiving data in a wireless access system of the present invention has been described based on the 3GPP LTE system, the method may be applied to various wireless access systems in addition to the 3GPP LTE system.

The invention claimed is:

1. A method for transmitting a signal by a user equipment in a wireless communication system, the user equipment being configured with a plurality of cells including a first cell and a second cell, each of the first cell and the second cell operating in time division duplex (TDD), the method comprising:

receiving, by the user equipment, uplink (UL) grant information in a first downlink (DL) subframe on the first cell, the UL grant information scheduling a UL transmission on the second cell; and performing, by the user equipment, the UL transmission in a UL subframe on the second cell via a physical UL shared channel based on the UL grant information, wherein the first cell and the second cell have different TDD UL-DL configurations, and wherein the UL subframe on the second cell is determined based on a TDD UL-DL configuration of the second cell.

2. The method according to claim 1, wherein when the first DL subframe is a subframe n and the UL subframe is a subframe n+k, a timing relation k between the first DL subframe and the UL subframe is given based on the TDD UL-DL configuration of the second cell according to the following table:

| TDD UL-DL     | subframe number n |   |   |   |   |   |   |   |   |   |
|---------------|---|---|---|---|---|---|---|---|---|---|
| Configuration | 0 | 1 | 2 | 3 | 4 | 5 | 6 | 7 | 8 | 9 |
| 0 | 4 | 6 |   |   |   | 4 | 6 |   |   |   |
| 1 |   | 6 |   |   | 4 |   | 6 |   |   | 4 |
| 2 |   |   |   | 4 |   |   |   |   | 4 |   |
| 3 | 4 |   |   |   |   |   |   | 4 | 4 |   |
| 4 |   |   |   |   |   |   |   | 4 | 4 |   |
| 5 |   |   |   |   |   |   |   | 4 |   |   |
| 6 | 7 | 7 |   |   |   | 7 | 7 |   |   | 5. |

3. The method according to claim 1, wherein subframe configuration on each of the first cell and the second cell is given based on a TDD UL-DL configuration of a corresponding cell according to the following table:

| TDD UL-DL     | Subframe number |   |   |   |   |   |   |   |   |   |
|---------------|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D, | where U denotes a UL subframe, D denotes a DL subframe, and S denotes a subframe comprising a DL period, a guard period, and a UL period.

4. The method according to claim 1, further comprising:
receiving, by the user equipment, hybrid automatic repeat and request (HARQ) acknowledgement/negative-acknowledgement (ACK/NACK) information for the UL transmission in a second DL subframe on the second cell,
wherein a timing relation between the UL subframe and the second DL subframe is determined based on the TDD UL-DL configuration of the second cell.

5. The method according to claim 4, wherein when the second DL subframe is a subframe i and the UL subframe is a subframe i-k, the timing relation k between the second DL subframe and the UL subframe is given based on the TDD UL-DL configuration of the second cell according to the following table:

| TDD UL-DL     | subframe number i |   |   |   |   |   |   |   |   |   |
|---------------|---|---|---|---|---|---|---|---|---|---|
| Configuration | 0 | 1 | 2 | 3 | 4 | 5 | 6 | 7 | 8 | 9 |
| 0 | 7 | 4 |   |   |   | 7 | 4 |   |   |   |
| 1 |   | 4 |   |   | 6 |   | 4 |   |   | 6 |
| 2 |   |   |   | 6 |   |   |   |   | 6 |   |
| 3 | 6 |   |   |   |   |   |   | 6 | 6 |   |
| 4 |   |   |   |   |   |   |   | 6 | 6 |   |
| 5 |   |   |   |   |   |   |   | 6 |   |   |
| 6 |   | 6 | 4 |   |   |   | 7 | 4 |   | 6. |

6. The method according to claim 4, wherein the HARQ ACK/NACK information is received via a physical HARQ indicator channel.

7. The method according to claim 1, wherein the UL grant information is received via a physical DL control channel.

8. A user equipment configured to transmit a signal in a wireless communication system, the user equipment being configured with a plurality of cells including a first cell and a second cell, each of the first cell and the second cell operating in time division duplex (TDD), the user equipment comprising:
a radio frequency (RF) unit; and
a processor operatively connected to the RF unit and configured to:
receive uplink (UL) grant information in a first downlink (DL) subframe on the first cell through the RF unit, the UL grant information scheduling a UL transmission on the second cell, and
perform the UL transmission in a UL subframe on the second cell via a physical UL shared channel based on the UL grant information through the RF unit,
wherein the first cell and the second cell have different TDD UL-DL configurations, and
wherein the UL subframe on the second cell is determined based on a TDD UL-DL configuration of the second cell.

9. The user equipment according to claim 8, wherein when the first DL subframe is a subframe n and the UL subframe is a subframe n+k, a timing relation k between the first DL subframe and the UL subframe is given based on the TDD UL-DL configuration of the second cell according to the following table:

| TDD UL-DL     | subframe number n |   |   |   |   |   |   |   |   |   |
|---------------|---|---|---|---|---|---|---|---|---|---|
| Configuration | 0 | 1 | 2 | 3 | 4 | 5 | 6 | 7 | 8 | 9 |
| 0 | 4 | 6 |   |   |   | 4 | 6 |   |   |   |
| 1 |   | 6 |   |   | 4 |   | 6 |   |   | 4 |
| 2 |   |   |   | 4 |   |   |   |   | 4 |   |
| 3 | 4 |   |   |   |   |   |   | 4 | 4 |   |
| 4 |   |   |   |   |   |   |   | 4 | 4 |   |
| 5 |   |   |   |   |   |   |   | 4 |   |   |
| 6 | 7 | 7 |   |   |   | 7 | 7 |   |   | 5. |

10. The user equipment according to claim 8, wherein subframe configuration on each of the first cell and the second cell is given based on a TDD UL-DL configuration of a corresponding cell according to the following table:

| TDD UL-DL     | Subframe number |   |   |   |   |   |   |   |   |   |
|---------------|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D, | where U denotes a UL subframe, D denotes a DL subframe, and S denotes a subframe comprising a DL period, a guard period, and a UL period.

11. The user equipment according to claim 8, wherein the processor is further configured to receive hybrid automatic repeat and request (HARQ) acknowledgement/negative-acknowledgement (ACK/NACK) information for the UL transmission in a second DL subframe on the second cell,
wherein a timing relation between the UL subframe and the second DL subframe is determined based on the TDD UL-DL configuration of the second cell.

12. The user equipment according claim 11, wherein when the second DL subframe is a subframe i and the UL subframe is a subframe i-k, the timing relation k between the second subframe and the UL subframe is given based on the TDD UL-DL configuration of the second cell according to the following table:

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6. |

13. The user equipment according to claim 11, wherein the HARQ ACK/NACK information is received via a physical HARQ indicator channel.

14. The user equipment according to claim 8, wherein the UL grant information is received via a physical DL control channel.

* * * * *